(12) United States Patent
Steer et al.

(10) Patent No.: US 8,005,160 B2
(45) Date of Patent: *Aug. 23, 2011

(54) PROCESSING DIFFERENTIATED HIERARCHICAL MODULATION USED IN RADIO FREQUENCY COMMUNICATIONS

(75) Inventors: David G. Steer, Nepean (CA); Curt Dodd, Ottawa (CA); Ming Jia, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 527 days.

This patent is subject to a terminal disclaimer.

(21) Appl. No.: 11/945,162

(22) Filed: Nov. 26, 2007

(65) Prior Publication Data

US 2008/0159430 A1    Jul. 3, 2008

Related U.S. Application Data

(63) Continuation-in-part of application No. 11/618,774, filed on Dec. 30, 2006.

(60) Provisional application No. 60/882,921, filed on Dec. 30, 2006.

(51) Int. Cl.
*H04L 1/02* (2006.01)
*H04B 7/02* (2006.01)

(52) U.S. Cl. ........ 375/267; 375/260; 375/295; 375/299; 370/334; 455/101

(58) Field of Classification Search .................. 375/340, 375/267, 295, 297, 260, 299; 370/334; 455/101
See application file for complete search history.

(56) References Cited

U.S. PATENT DOCUMENTS

| | | | |
|---|---|---|---|
| 5,966,412 A | 10/1999 | Ramaswamy | |
| 7,593,697 B2 * | 9/2009 | Zhu et al. | 455/102 |
| 7,630,451 B2 * | 12/2009 | Collins et al. | 375/261 |
| 7,894,401 B2 | 2/2011 | Von Elbwart et al. | |
| 2005/0120097 A1 | 6/2005 | Walton et al. | |
| 2006/0171283 A1 | 8/2006 | Vijayan | |
| 2006/0198454 A1 | 9/2006 | Chung | |
| 2006/0280262 A1 * | 12/2006 | Malladi | 375/299 |
| 2008/0025241 A1 * | 1/2008 | Bhushan et al. | 370/312 |
| 2011/0002430 A1 | 1/2011 | Kim et al. | |

* cited by examiner

*Primary Examiner* — Ted M Wang

(74) *Attorney, Agent, or Firm* — Withrow & Terranova, PLLC

(57) ABSTRACT

The present invention employs hierarchical modulation to simultaneously transmit data over different modulation layers using a carrier RF signal. Each modulation layer may be of a higher or lower order than the other modulation layers. Certain embodiments of the present invention may transmit different information on the different modulation layers. Other embodiments of the present invention may use the different layers for processing information differently.

25 Claims, 18 Drawing Sheets

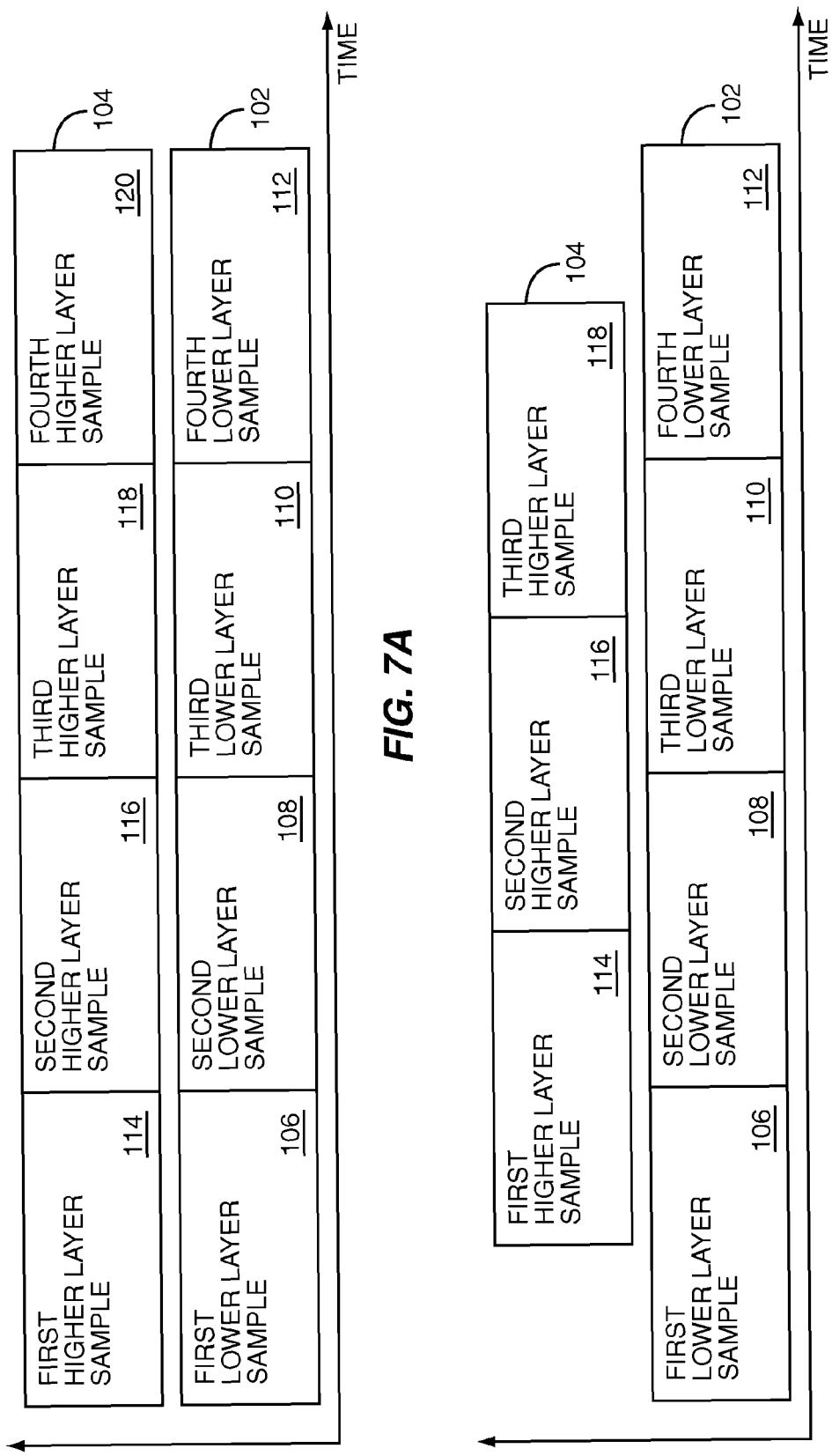

US 8,005,160 B2

PROCESSING DIFFERENTIATED HIERARCHICAL MODULATION USED IN RADIO FREQUENCY COMMUNICATIONS

This application is a Continuation-in-Part of U.S. utility application Ser. No. 11/618,774 entitled CONTENT DIFFERENTIATED HIERARCHICAL MODULATION USED IN RADIO FREQUENCY COMMUNICATIONS, filed Dec. 30, 2006, currently pending, the disclosure of which is incorporated herein by reference in its entirety.

This application claims the benefit of provisional patent application Ser. No. 60/882,921 entitled MODULATION DIVISION MULTIPLE ACCESS, filed Dec. 30, 2006, the disclosure of which is hereby incorporated by reference in its entirety.

FIELD OF THE INVENTION

The present invention relates to radio frequency (RF) transmitter modulation techniques used in RF communications systems.

BACKGROUND OF THE INVENTION

With each successive generation of RF communications systems, modulation techniques, access schemes, and communications protocols become more sophisticated and demanding. One universal goal is to increase the amount of information transmitted in a given communications band, and to accommodate different types of information that must be communicated. For example, first generation cellular networks were designed to provide only voice services; however, these networks have evolved to provide a number of simultaneous services, including internet traffic, such as emails, and provide multi-media services, such as broadcast and on-demand services in specific geographic areas. Each of these services may have its own specific requirements for bandwidth, latency, acceptable error rate, and locations of availability. As a result, different processing methods have been developed, including orthogonal frequency division multiplexing (OFDM), single carrier frequency division multiplexing (SC-FDM), single frequency networks (SFN), multiple-input multiple-output (MIMO), and multi-hop and relayed transmissions. OFDM and SC-FDM can distribute a high bandwidth signal onto multiple sub-carriers of lower bandwidths. SFNs improve signal coverage of broadcast data by transmitting the same information at the same time from multiple antennas. MIMO adds antennas to a system to provide spatial multiplexing, diversity, or both. Multi-hop and relayed transmissions provide improved system capacity or extended coverage by relaying transmissions through multiple transceiver stations. Therefore, as communications systems evolve, there is a need to increase the number and diversity of services by improving how bandwidth is utilized.

SUMMARY OF THE INVENTION

The present invention employs hierarchical modulation to simultaneously transmit data over different modulation layers using a carrier RF signal. Each modulation layer may be of a higher or lower order than the other modulation layers. Certain embodiments of the present invention may transmit different information on the different modulation layers. Other embodiments of the present invention may use the different layers for processing information differently.

Transmitting different information on different modulation layers may provide many useful applications. Unicast data is transmitted to a single user, whereas broadcast data is transmitted to multiple users. The present invention includes any combination of unicast data and broadcast data to be transmitted using any combination of the different modulation layers. Unicast data and broadcast data include different types of content, including audio content, video content, voice content, and specific data content.

Audio content may provide at least one channel of audio programming, which may provide an on-demand audio program that is unicast to a single user, or distributed audio programs that are broadcast to multiple users. Similarly, video content may provide at least one channel of video programming. Voice content may include individual cellular telephone calls. Specific data content may include internet data, including emails, short messaging service messages, or downloaded information. The present invention includes any combination of types of content to be transmitted using any combination of the different modulation layers.

In the present invention, the different information on different modulation layers may be transmitted to different geographic areas. The content of the different information may be associated with different geographic areas. One example is a national news program that may be broadcast to a large geographic area from multiple base stations using one modulation layer, and a local traffic program that may be broadcast to a subset of the large geographic area from one base station using a different modulation layer.

The present invention may include using the different modulation layers in conjunction with other techniques for processing different information streams. One modulation layer may be used to provide broadcast data to multiple base stations that form a single frequency network (SFN). An SFN may be used to improve signal coverage of broadcast data by transmitting the same information at the same time from multiple antennas.

MIMO adds antennas to a system to provide spatial multiplexing, diversity, or both. The information transmitted from MIMO antennas may be provided from any combination of the different modulation layers. The additional MIMO antennas may be used to strengthen an SFN. One modulation layer may be used to provide broadcast data, which is transmitted from multiple MIMO antennas simultaneously. Another modulation layer may be used to provide multiple channels of data, which are transmitted from different MIMO antennas.

Video broadcast data may have high bandwidth requirements. OFDM or SC-FDM can distribute a high bandwidth signal onto multiple sub-carriers of lower bandwidth. The present invention may be used to provide different sub-carriers using different modulation layers, or to provide at least one sub-carrier using one modulation layer, and other information using at least one other modulation layer.

Multi-hop and relayed transmissions provide broadcast data or other system data to multiple base stations. The present invention may be used to provide any combination of system data, relayed data, and end user data using any combination of modulation layers. Certain modulation techniques may include one or more modulation layers that are compatible with modulation techniques that are used in existing communications networks. Therefore, the present invention may provide compatibility between different communications systems by using compatible modulation layers, which may allow an upgraded communications system to be backward compatible with legacy user equipment (UE).

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 7A shows the alignment of lower modulation layer data with higher modulation layer data in one embodiment of the present invention.

FIG. 7B shows the lower modulation layer data time-shifted from the higher modulation layer data in an alternate embodiment of the present invention.

Figure 1:
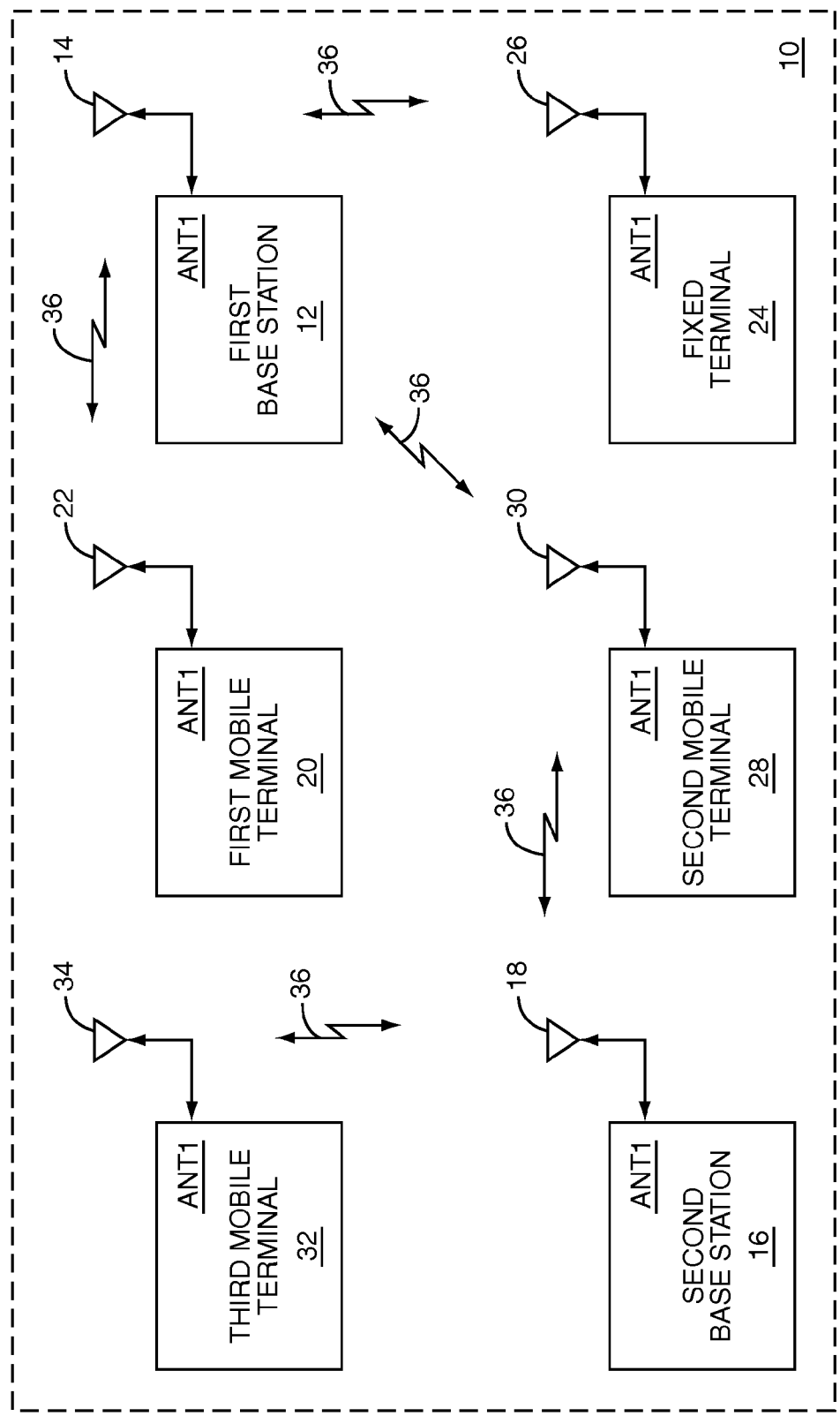
FIG. 1 shows an RF communications system.
Figure 9:
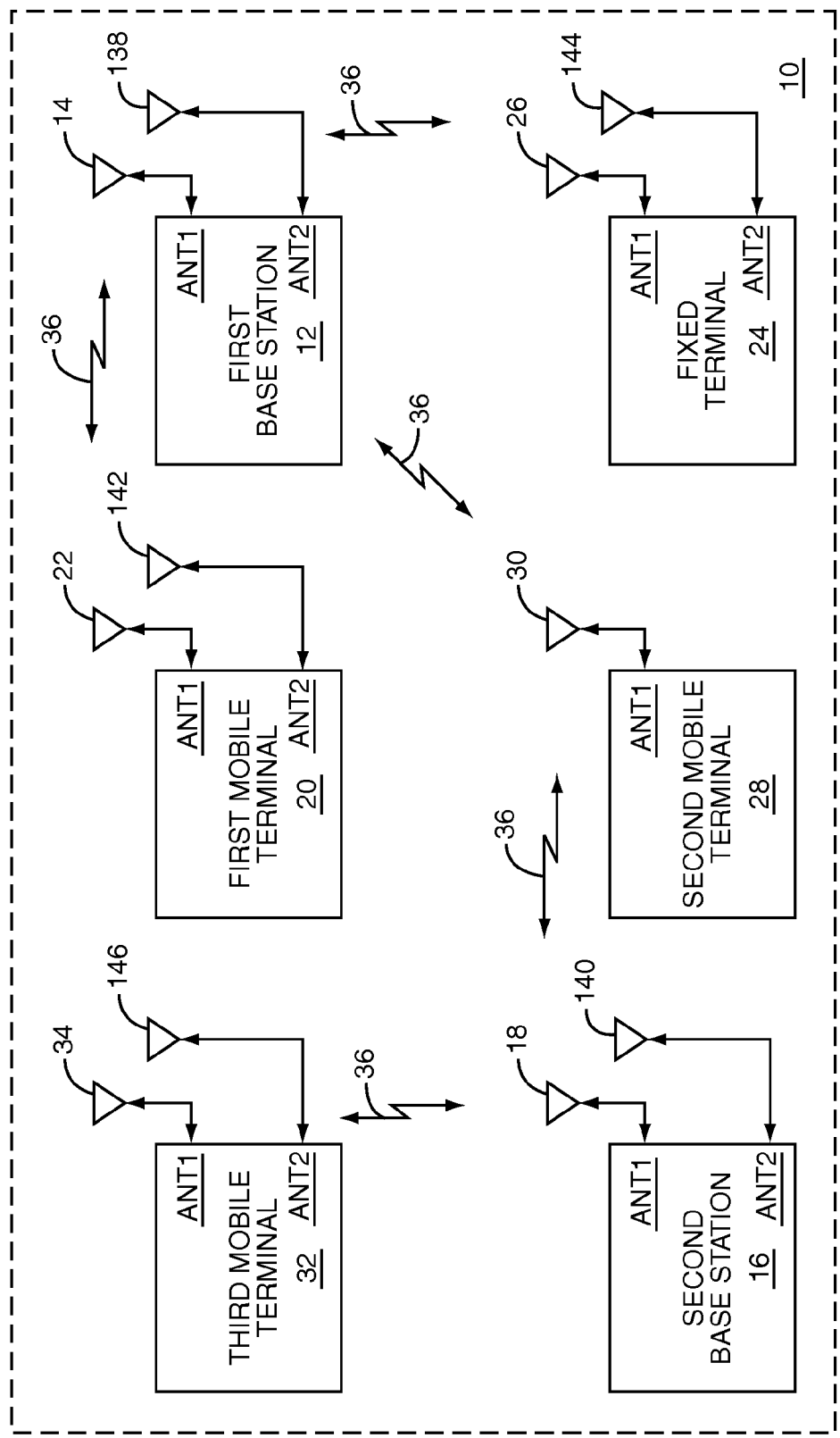

FIG. 9 adds MIMO antennas to the base stations and some of the terminals illustrated in FIG. 1.

Figure 10:
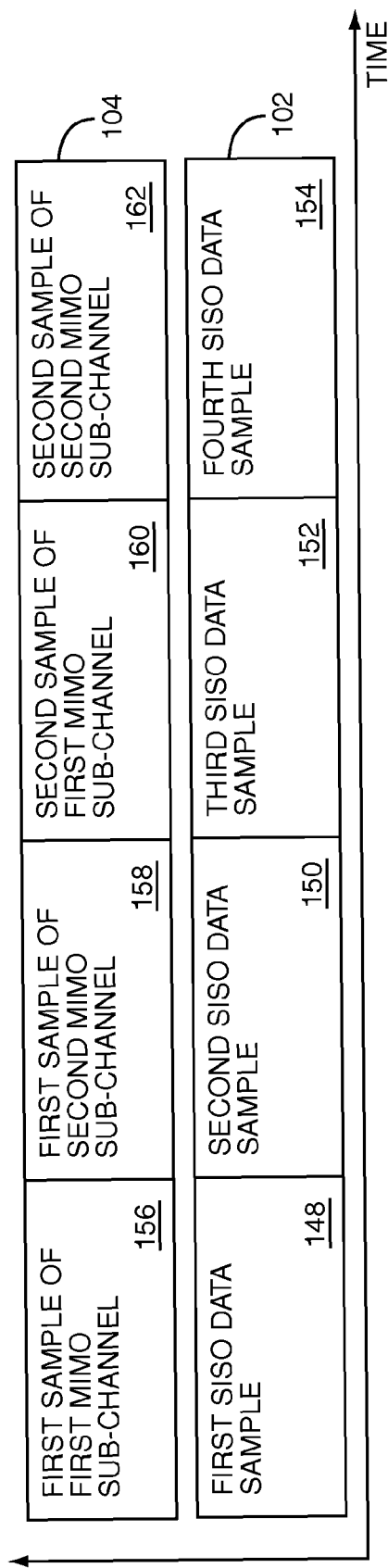

FIG. 10 shows single-input single-output (SISO) data included in the lower modulation layer data, and two MIMO sub-channels included in the higher modulation layer data.

Figure 11:
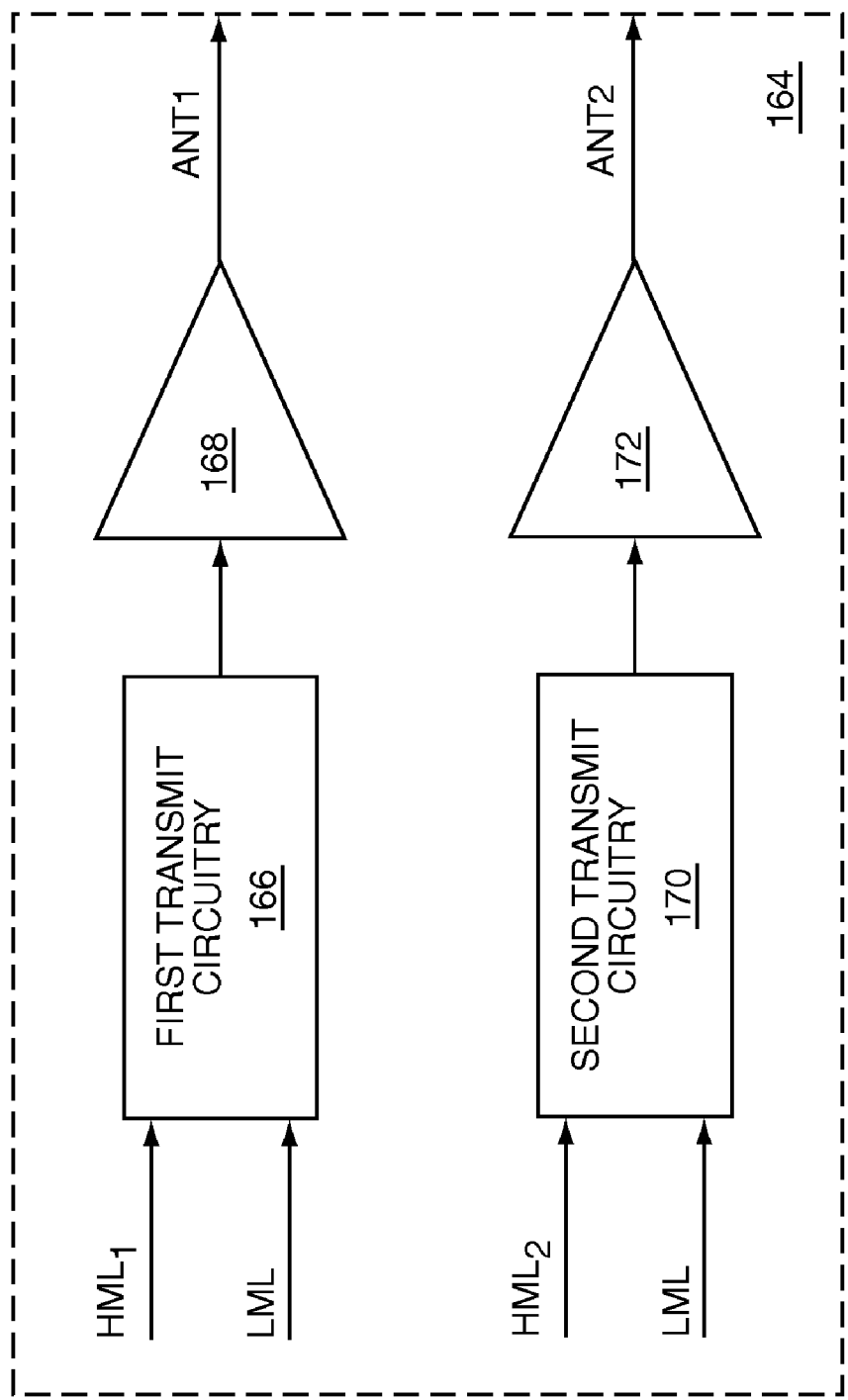

FIG. 11 shows the present invention used with MIMO transmitter circuitry.

Figure 12:
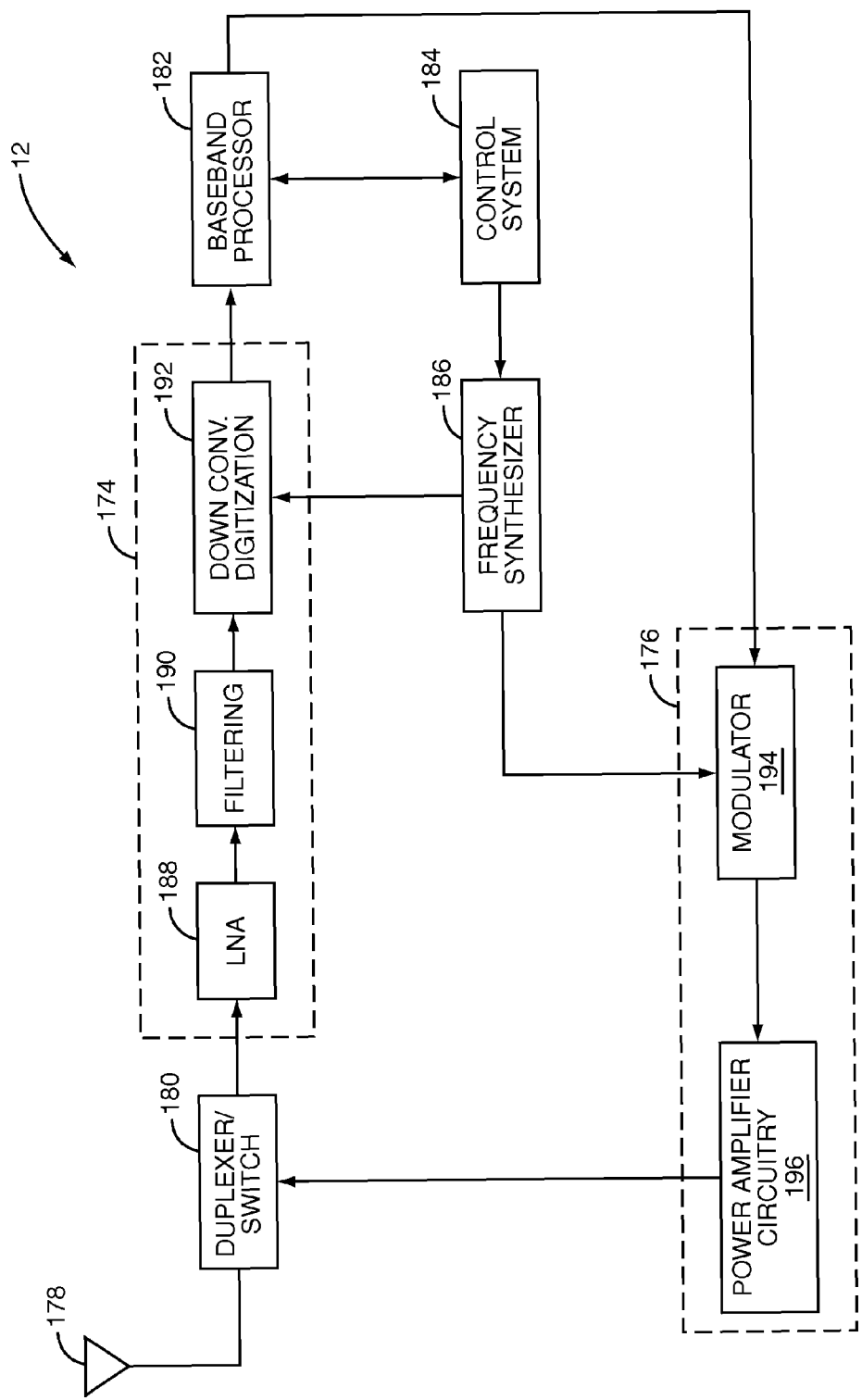

FIG. 12 shows details of the first base station illustrated in FIG. 1.

Figure 13:
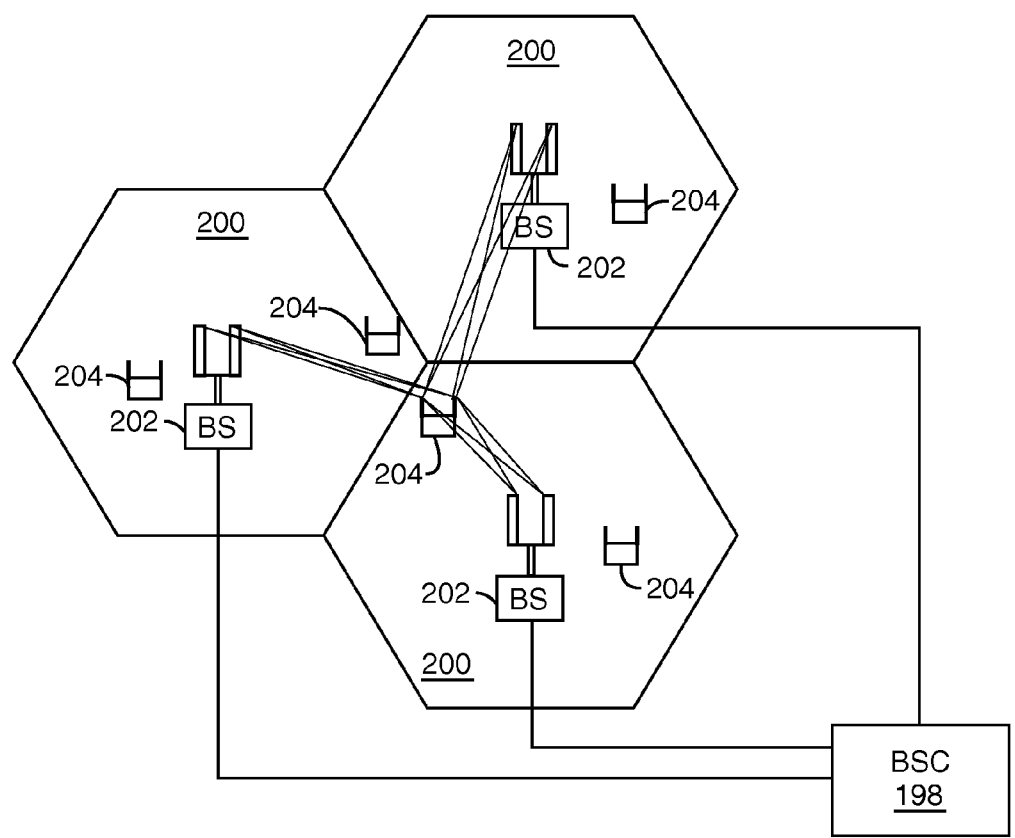

FIG. 13 is a block representation of a cellular communication system.

Figure 14:
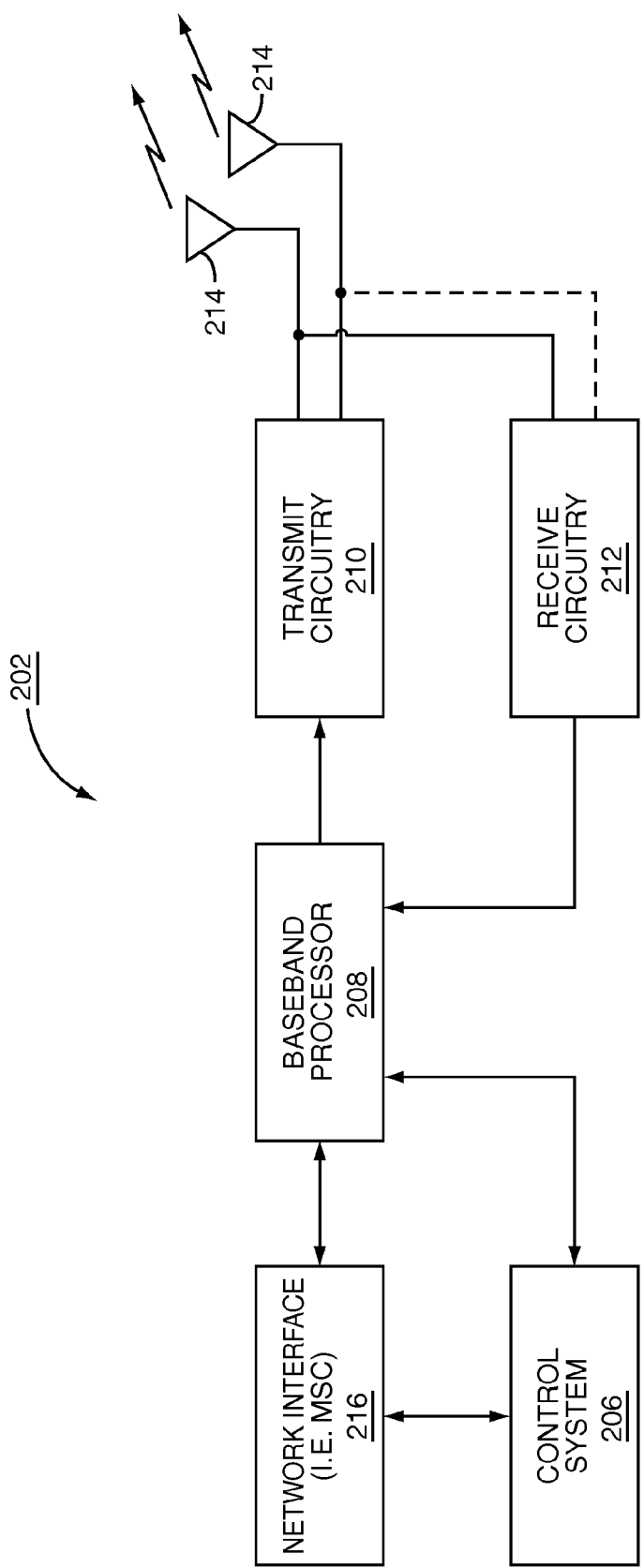

FIG. 14 is a block representation of a base station according to one embodiment of the present invention.

Figure 15:
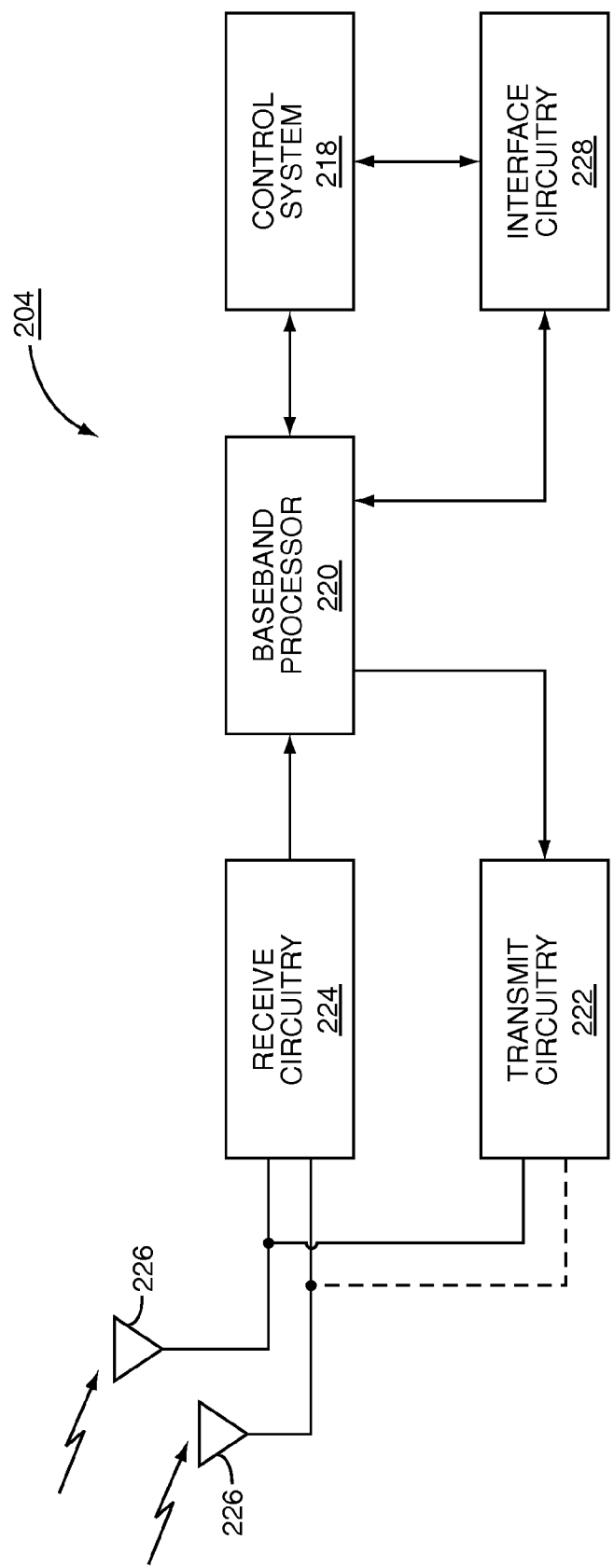

FIG. 15 is a block representation of a mobile terminal according to one embodiment of the present invention.

Figure 16:
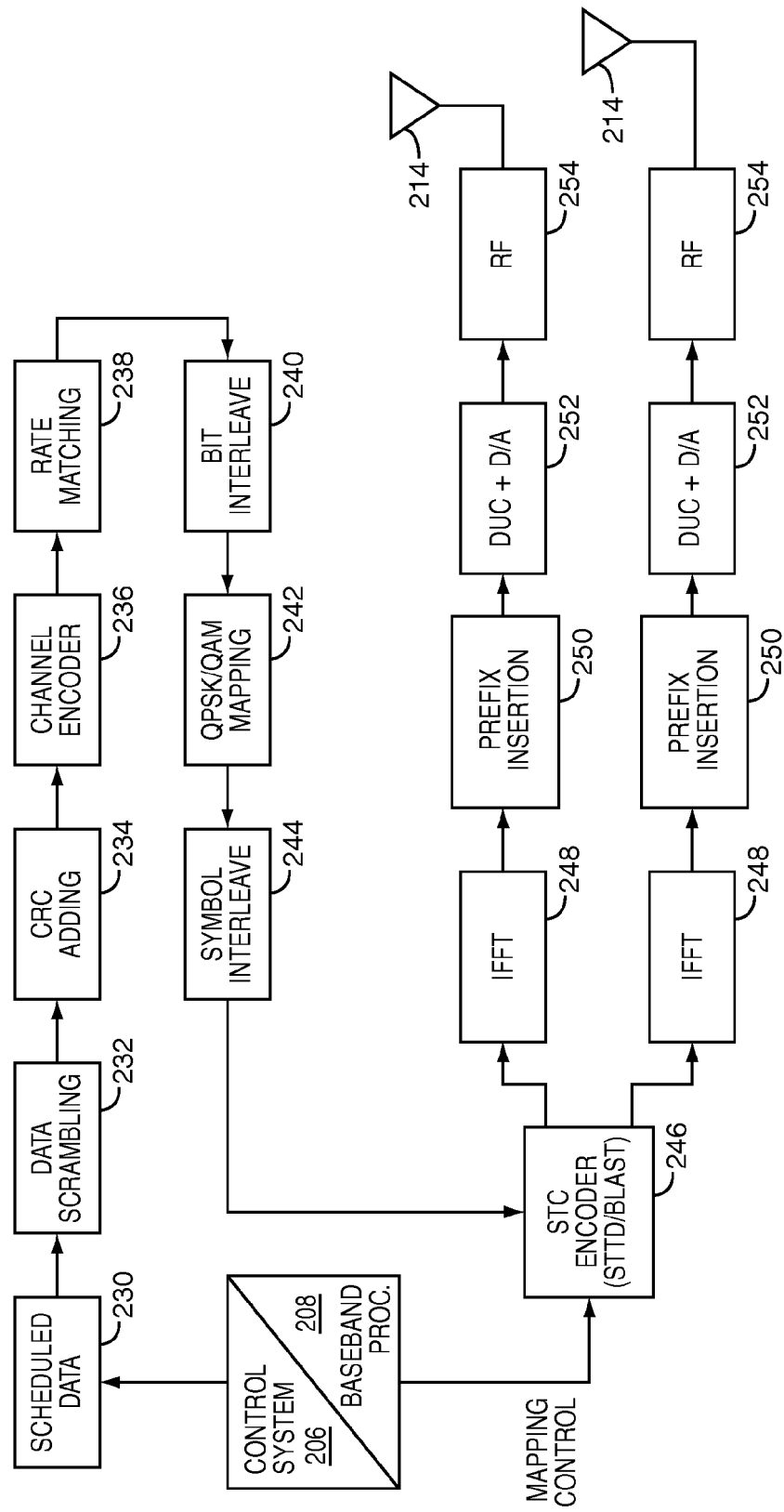

FIG. 16 is a logical breakdown of an OFDM transmitter architecture according to one embodiment of the present invention.

Figure 17:
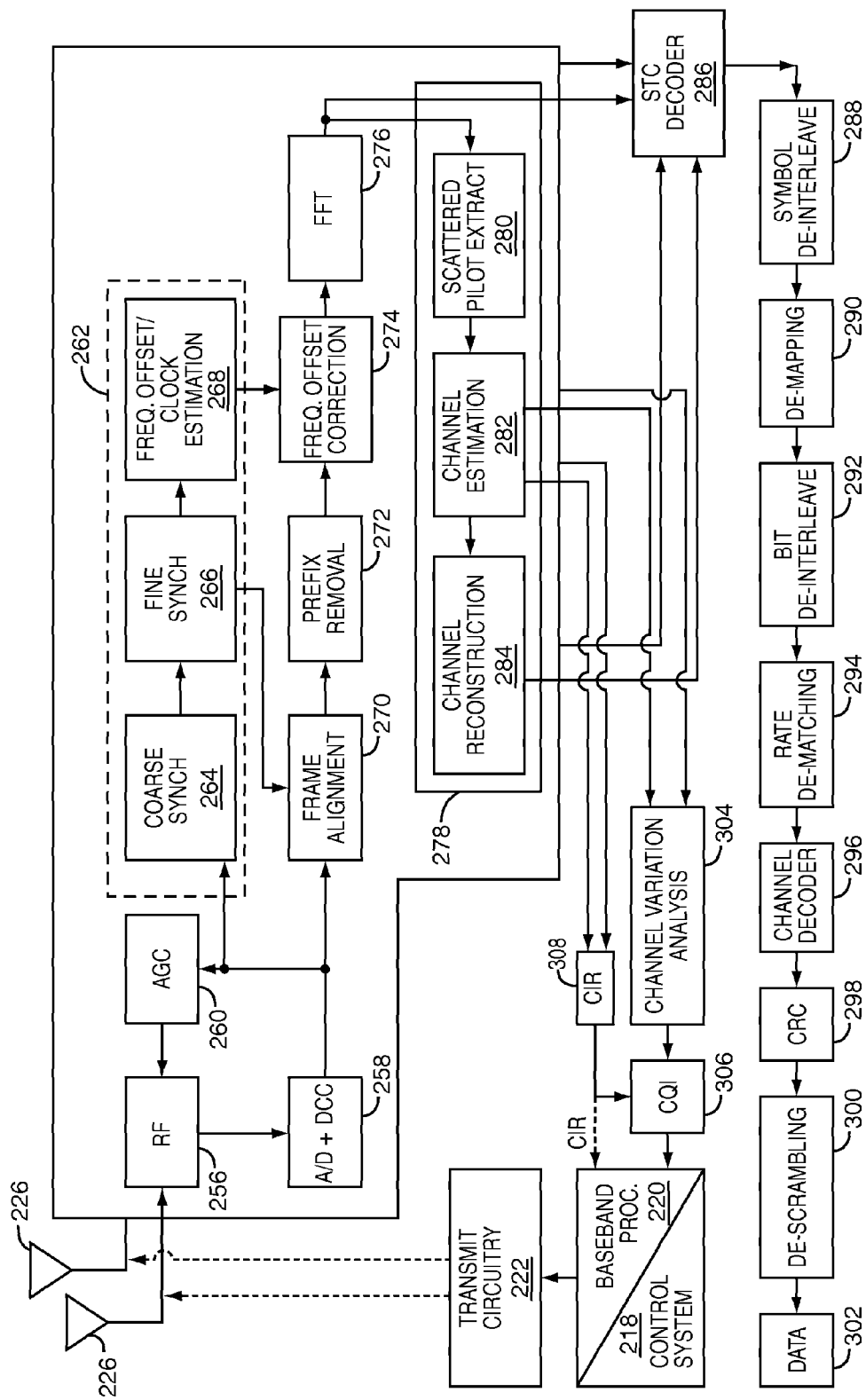

FIG. 17 is a logical breakdown of an OFDM receiver architecture according to one embodiment of the present invention.

Figure 18:
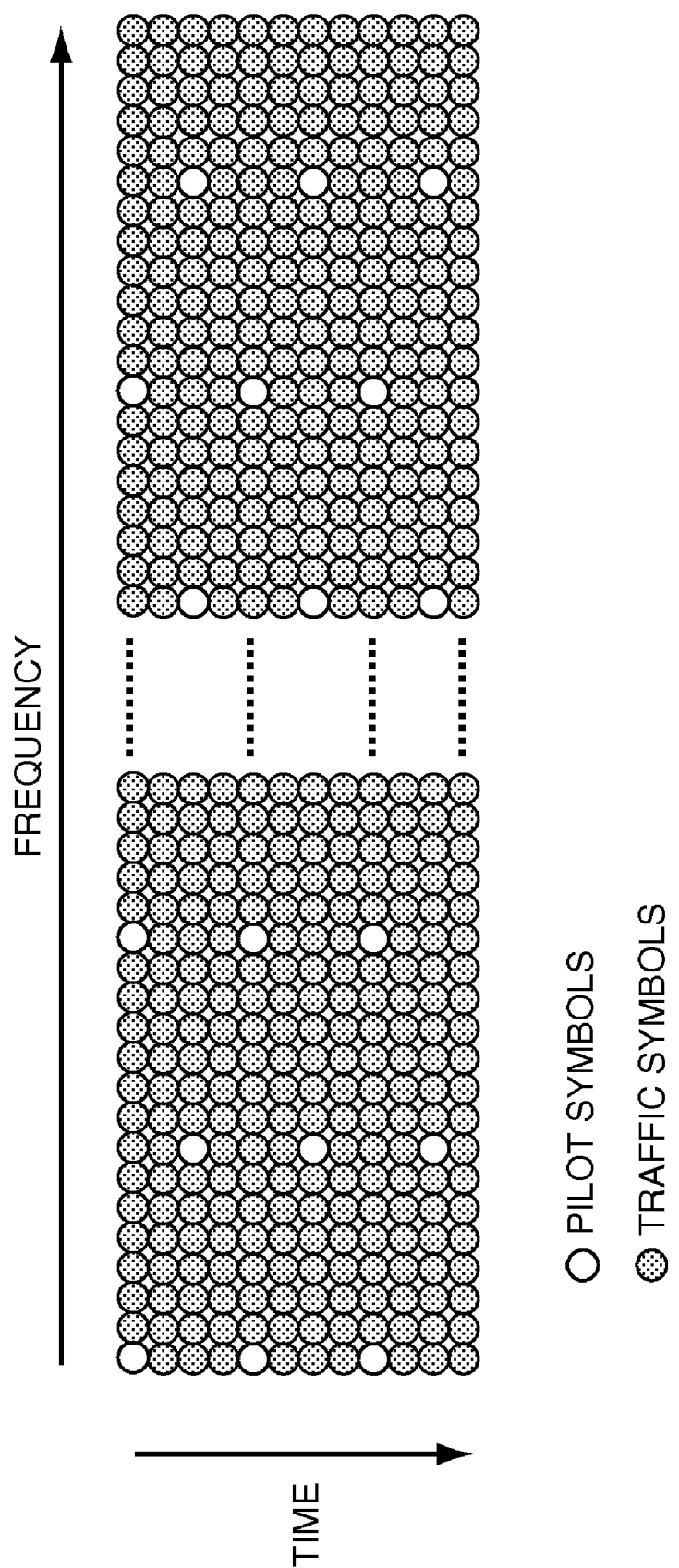

FIG. 18 illustrates a pattern of sub-carriers for carrying pilot symbols in an OFDM environment.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention employs hierarchical modulation to simultaneously transmit data over different modulation layers using a carrier RF signal. Each modulation layer may be of a higher or lower order than the other modulation layers. Certain embodiments of the present invention may transmit different information on the different modulation layers. Other embodiments of the present invention may use the different layers for processing different information streams.

Transmitting different information on different modulation layers may provide many useful applications. Unicast data is transmitted to a single user, whereas broadcast data is transmitted to multiple users. The present invention includes any combination of unicast data and broadcast data to be transmitted using any combination of the different modulation layers. Unicast data and broadcast data include different types of content, including audio content, video content, voice content, and specific data content.

Audio content may provide at least one channel of audio programming, which may provide an on-demand audio program that is unicast to a single user, or distributed audio programs that are broadcast to multiple users. Similarly, video content may provide at least one channel of video programming. Voice content may include individual cellular telephone calls. Specific data content may include internet data, including emails, short messaging service messages, or downloaded information. The present invention includes any combination of types of content to be transmitted using any combination of the different modulation layers.

In the present invention, the different information on different modulation layers may be transmitted to different geographic areas. The content of the different information may be associated with different geographic areas. One example is a national news program that may be broadcast to a large geographic area from multiple base stations using one modulation layer, and a local traffic program that may be broadcast to a subset of the large geographic area from one base station using a different modulation layer.

The present invention may include using the different modulation layers in conjunction with other techniques for processing different information streams. One modulation layer may be used to provide broadcast data to multiple base stations that form a single frequency network (SFN). A SFN may be used to improve signal coverage of broadcast data by transmitting the same information at the same time from multiple antennas.

Multiple-input multiple-output (MIMO) adds antennas to a system to provide spatial multiplexing, diversity, or both. The information transmitted from MIMO antennas may be provided from any combination of the different modulation layers. The additional MIMO antennas may be used to strengthen an SFN. One modulation layer may be used to provide broadcast data, which is transmitted from multiple MIMO antennas simultaneously. Another modulation layer may be used to provide multiple channels of data, which are transmitted from different MIMO antennas.

Video broadcast data may have high bandwidth requirements. Orthogonal frequency division multiplexing (OFDM) or single carrier frequency division multiplexing (SC-FDM) can distribute a high bandwidth signal onto multiple sub-carriers of lower bandwidth. The present invention may be used to provide different sub-carriers using different modulation layers, or to provide at least one sub-carrier using one modulation layer, and other information using at least one other modulation layer.

Multi-hop and relayed transmissions provide broadcast data or other system data to multiple base stations. The present invention may be used to provide any combination of system data, relayed data, and end user data using any combination of modulation layers. Certain modulation techniques may include one or more modulation layers that are compatible with modulation techniques that are used in existing communications networks. Therefore, the present invention may provide compatibility between different communications systems by using compatible modulation layers, which may allow an upgraded communications system to be backward compatible with legacy user equipment (UE).

The present invention may be used to simultaneously download information directly to UE and to transmit system information to system transceivers, such as repeaters, relays, or base stations. The system information may include information for downloading by other system transceivers and synchronization information for broadcasting user information from multiple transceivers and antennas simultaneously. The present invention may provide compatibility between different communications systems having different modulation schemes, which may allow an upgraded communications system to be backward compatible with legacy UE. Additionally, low cost UE using the legacy modulation scheme could be feasible with such a system. For example, an upgraded system using multiple antennas, such as MIMO may be compatible with systems using single antennas, such as single-input single-output (SISO). A basic broadcast channel may be transmitted using one modulation layer from all of the MIMO antennas, and multiple supplemental broadcast channels may be transmitted using another modulation layer from different MIMO antennas. Legacy UE may receive the basic broadcast channel; however, upgraded UE is required to receive the supplemental broadcast channels.

Multiplexing is a processing technique for transmitting different streams of information using a common transmission entity. Frequency division multiplexing (FDM) transmits different streams of information using different frequencies. Time division multiplexing (TDM) interleaves different streams of information into a single combined information stream, which is then transmitted. OFDM and SC-FDM may combine with FDM and TDM to create multiple sub-carriers for transmitting different streams of information. Other multiplexing techniques may be used with OFDM and SC-FDM to provide additional sub-carriers. MIMO is a multiple antenna architecture, which may provide spatial multiplexing by allowing different information to be transmitted using different antennas. The present invention is associated with a new multiplexing technique called modulation division multiplexing (MDM), which transmits different information on different modulation layers. MDM may be associated with a new multiple access technique called modulation division multiple access (MDMA). The present invention may be used with a single carrier RF signal, a multiple carrier RF signal, or both. Any frequency or bandwidth RF signal may be used with the present invention.

Existing user equipment may be able to receive and transmit only the lower modulation layer, and ignore the higher modulation layer. An upgraded system may be backward compatible with existing communications equipment using existing features, while adding additional features that may be supported with upgraded equipment. In one embodiment of the present invention, the hierarchical modulation method includes rectangular quadrature amplitude modulation (QAM), where lower layer modulation layer bits are encoded with only phase shifting, such as data used with quadrature phase shift keying (QPSK), and upper modulation layer bits are encoded with QAM; however, existing communications equipment may ignore the QAM data bits and receive only those bits encoded with QPSK.

Alternate embodiments of the present invention may use non-rectangular QAM. While rectangular QAM is easy to illustrate and describe, separation of encoded data bits may be such that the encoded data bits are not equidistant from each other. Encoding of the data bits may be modified to maximize signal margins, may compensate for effects introduced during transmission, reception, or both.

FIG. 1 shows an RF communications system 10, such as a cellular communications system, having a first base station 12 with a first antenna port ANT1 coupled to a first base station antenna 14, a second base station 16 with the first antenna port ANT1 coupled to a second base station antenna 18, a first mobile terminal 20 with the first antenna port ANT1 coupled to a first mobile antenna 22, a fixed terminal 24 with the first antenna port ANT1 coupled to a fixed terminal antenna 26, a second mobile terminal 28 with the first antenna port ANT1 coupled to a second mobile antenna 30, and a third mobile terminal 32 with the first antenna port ANT1 coupled to a third mobile antenna 34. The antennas 14, 18, 22, 26, 30, 34 transmit and receive radiated RF signals 36. The base stations 12, 16 control information flow to and from the terminals 20, 24, 28, 32, which are ideally controlled by whichever base station is the closest, presents the best quality RF link, or both.

Figure 2A:
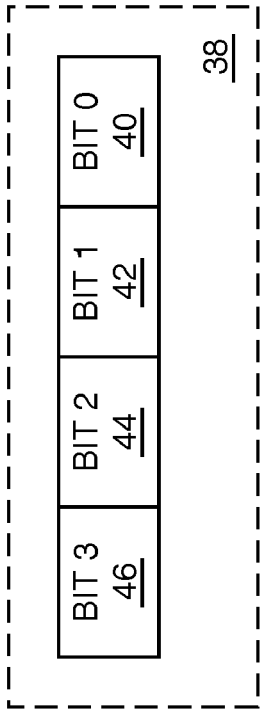
FIG. 2A shows a modulation symbol having four bits of information.

The radiated RF signals 36 are modulated to encode digital information. A number of modulation and encoding techniques may be used, including frequency modulation (FM) with frequency shift keying (FSK), phase modulation (PM) with phase shift keying (PSK) or Gaussian Minimum Shift Keying (GMSK), amplitude modulation (AM) with amplitude shift keying (ASK), or any combination thereof. One common modulation technique in cellular communications systems is a combination of AM and PM, which is QAM, as described above. One common modulation technique in early generations of cellular communications systems is QPSK, which can encode two bits of information with each modulation symbol, or phase shift. FIG. 2A shows a modulation symbol 38 having four bits of information, including bit zero 40, bit one 42, bit two 44, and bit three 46. To encode four bits of information, sixteen different possible modulation points are required for each modulation symbol 38.

Figure 2B:
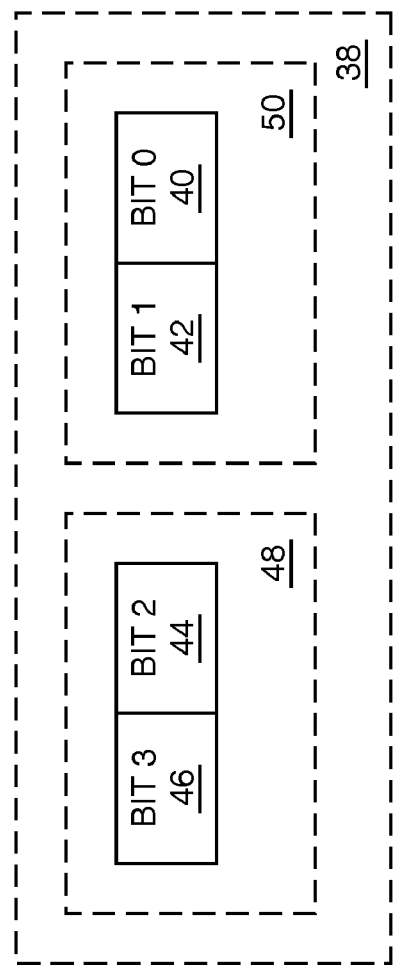
FIG. 2B shows one embodiment of the present invention wherein the modulation symbol illustrated in FIG. 2A is divided into a lower modulation symbol and a higher modulation symbol.

FIG. 2B shows one embodiment of the present invention by dividing the modulation symbol 38 illustrated in FIG. 2A into a lower modulation symbol 48 and a higher modulation symbol 50. The lower modulation symbol 48 includes bit two 44 and bit three 46. The higher modulation symbol 50 includes bit zero 40 and bit one 42. The lower and higher modulation symbols 48, 50 may encode information that is unrelated, that may be on different channels or sub-channels, or that may be differentiated in some manner. Other embodiments of the present invention may divide the modulation symbol 38 into more than two hierarchical modulation symbols, such as the lower modulation symbol 48, the higher modulation symbol 50, and at least one supplemental modulation symbol.

The present invention may use a modulation symbol that may be divided into any number of sub-symbols. Each sub-symbol may include any number of bits. The bits may be assigned to each sub-symbol in any order. Each bit of data in a modulation sub-symbol may be used to transmit data intended for one unique receiver only or for more than one receiver. Multiple bits of data in a modulation sub-symbol may be used to transmit data intended for one unique receiver only or for more than one receiver. Any receiver that receives transmitted data may receive all or part of a modulation symbol. The receiver may process all or part of a modulation symbol. The receiver may receive one or more sub-symbols. The receiver may process one or more sub-symbols. The receiver may receive one or more bits in a sub-symbol. The receiver may process one or more bits in a sub-symbol. For example, bit zero 40 may be used to transmit data to a first receiver, bit one 42 may be used to transmit data to a second receiver, bit two 44 may be used to transmit data to a third receiver, and bit three 46 may be used to transmit data to a fourth receiver. Alternatively, bit zero 40 may be used to transmit data to a first receiver, bit one 42 may be used to transmit data to a second receiver, and bits two and three 44, 46 may be used to transmit data to a third receiver.

Figure 3:
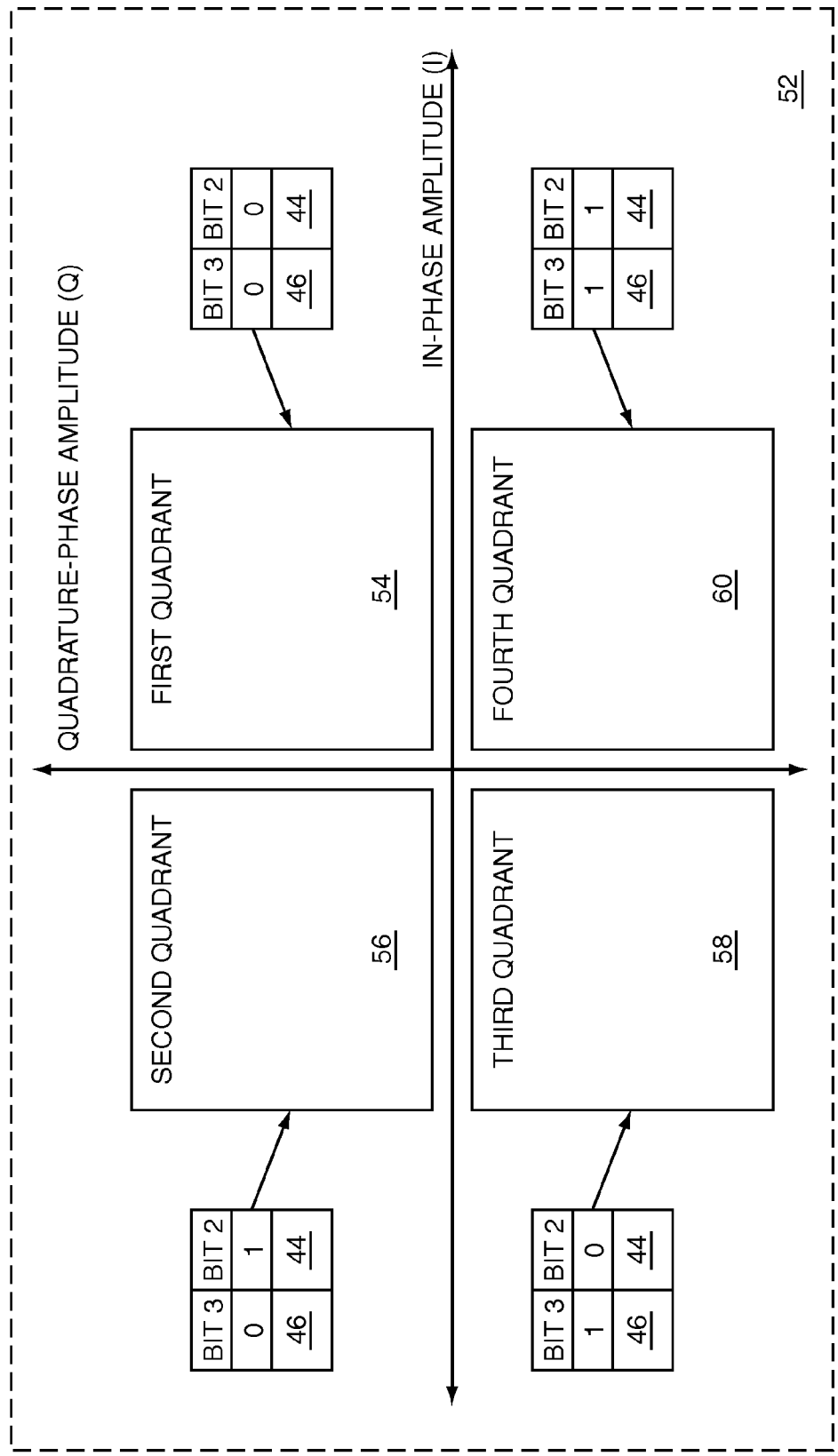
FIG. 3 shows the present invention used with quadrature modulation.

FIG. 3 shows one embodiment of the present invention used with quadrature modulation 52, which is associated with phase modulation. Phase-shifts may be represented graphically on a two-dimensional grid having an in-phase axis and a quadrature-phase axis. The two-dimensional grid may be divided into four quadrants, including a first quadrant 54, a second quadrant 56, a third quadrant 58, and a fourth quadrant 60. If the four quadrants are used to represent four different possible modulation points, then two bits of information can be encoded, which could correspond to bits two and three 44, 46 of the lower modulation symbol 48. The first quadrant 54 may be represented with bit two 44 equal to zero and bit three 46 equal to zero. The second quadrant 56 may be represented with bit two 44 equal to one and bit three 46 equal to zero. The third quadrant 58 may be represented with bit two 44 equal to zero and bit three 46 equal to one. The fourth quadrant 60 may be represented with bit two 44 equal to a one and bit three 46 equal to one.

Figure 4:
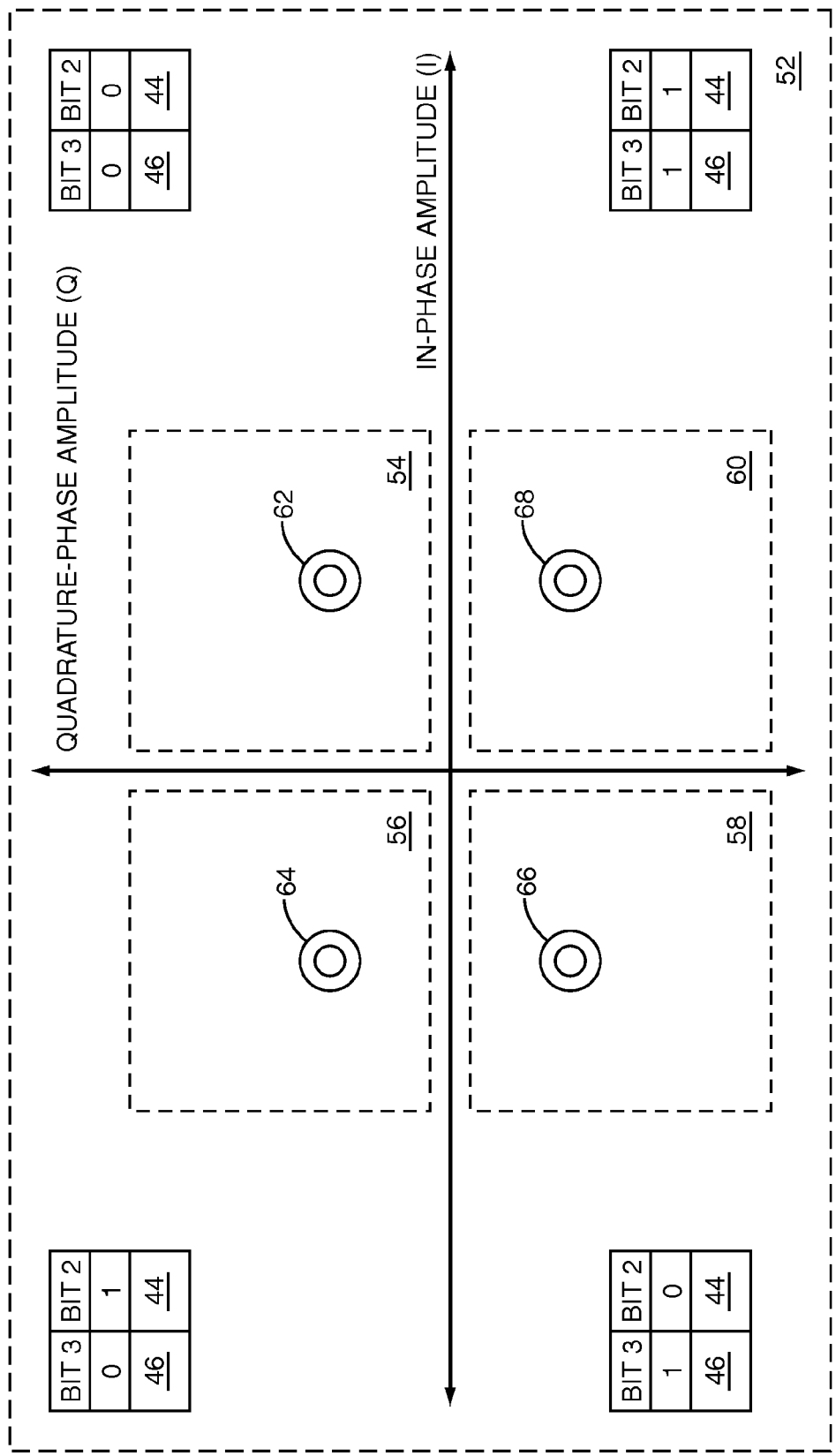
FIG. 4 shows the four constellation points used in quadrature phase shift keying (QPSK) modulation, and their relationship with the lower modulation symbol.

FIG. 4 shows the four constellation points used in QPSK modulation and their relationship with the lower modulation symbol 48, including bits two and three 44, 46. The four constellation points include a first quadrant point 62, a second quadrant point 64, a third quadrant point 66, and a fourth quadrant point 68. The four constellation points used in QPSK have equal amplitudes and are differentiated only by phase; however, as long as the constellation points fall within the correct quadrant 54, 56, 58, 60, the lower modulation symbol 48, including bits two and three 44, 46 will be decoded correctly. This characteristic may be beneficial in mixing a system with phase and amplitude modulation, such as QAM, with a system having only phase modulation, such as QPSK. The QPSK system may be able to reliably receive and transmit the lower modulation symbol 48 in systems with QAM; therefore, upgraded communications equipment using QAM may be backward compatible with existing communications equipment using QPSK for certain features. In one embodiment of the present invention, a communications system may alternate between transmitting QAM signals and QPSK signals. Other embodiments of the present invention may use other combinations of FM, PM, and AM to provide hierarchical modulation systems. Some embodiments of such systems may be backward compatible.

Figure 5:
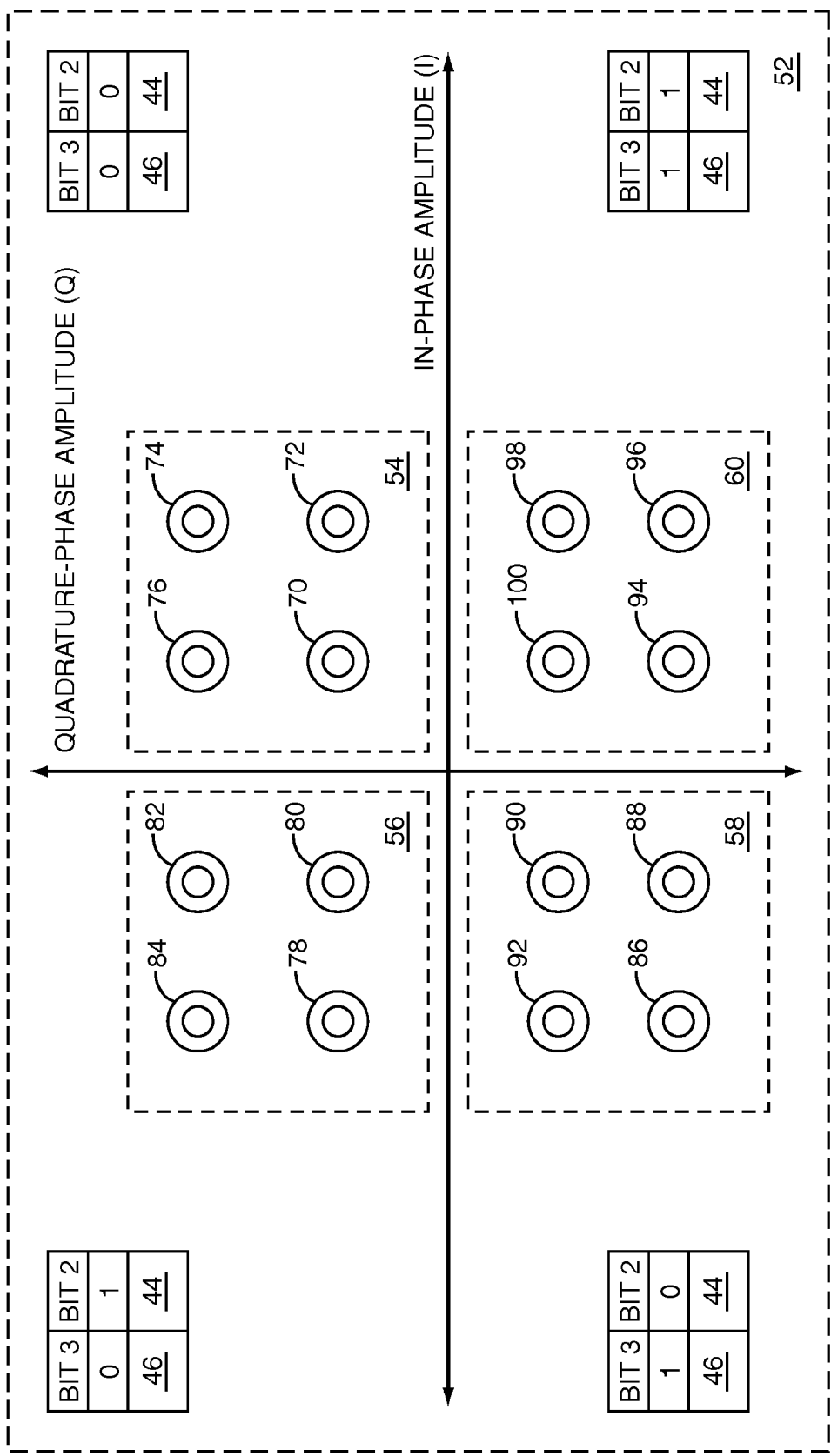
FIG. 5 shows the sixteen constellation points used in rectangular sixteen quadrature amplitude modulation (16-QAM), and their relationship with the lower modulation symbol.

FIG. 5 shows the sixteen constellation points used in rectangular sixteen quadrature amplitude modulation (16-QAM), and their relationship with the lower modulation symbol 48. With sixteen different possible modulation points, then four bits of information can be encoded, which could correspond to bits two and three 44, 46 of the lower modulation symbol 48 and bits zero and one 40, 42 of the higher modulation symbol 50. The sixteen constellation points include a first quadrant first higher point 70, a first quadrant second higher point 72, a first quadrant third higher point 74, a first quadrant fourth higher point 76, a second quadrant first higher point 78, a second quadrant second higher point 80, a second quadrant third higher point 82, a second quadrant fourth higher point 84, a third quadrant first higher point 86, a third quadrant second higher point 88, a third quadrant third higher point 90, a third quadrant fourth higher point 92, a fourth quadrant first higher point 94, a fourth quadrant second higher point 96, a fourth quadrant third higher point 98, and a fourth quadrant fourth higher point 100.

Figure 6:
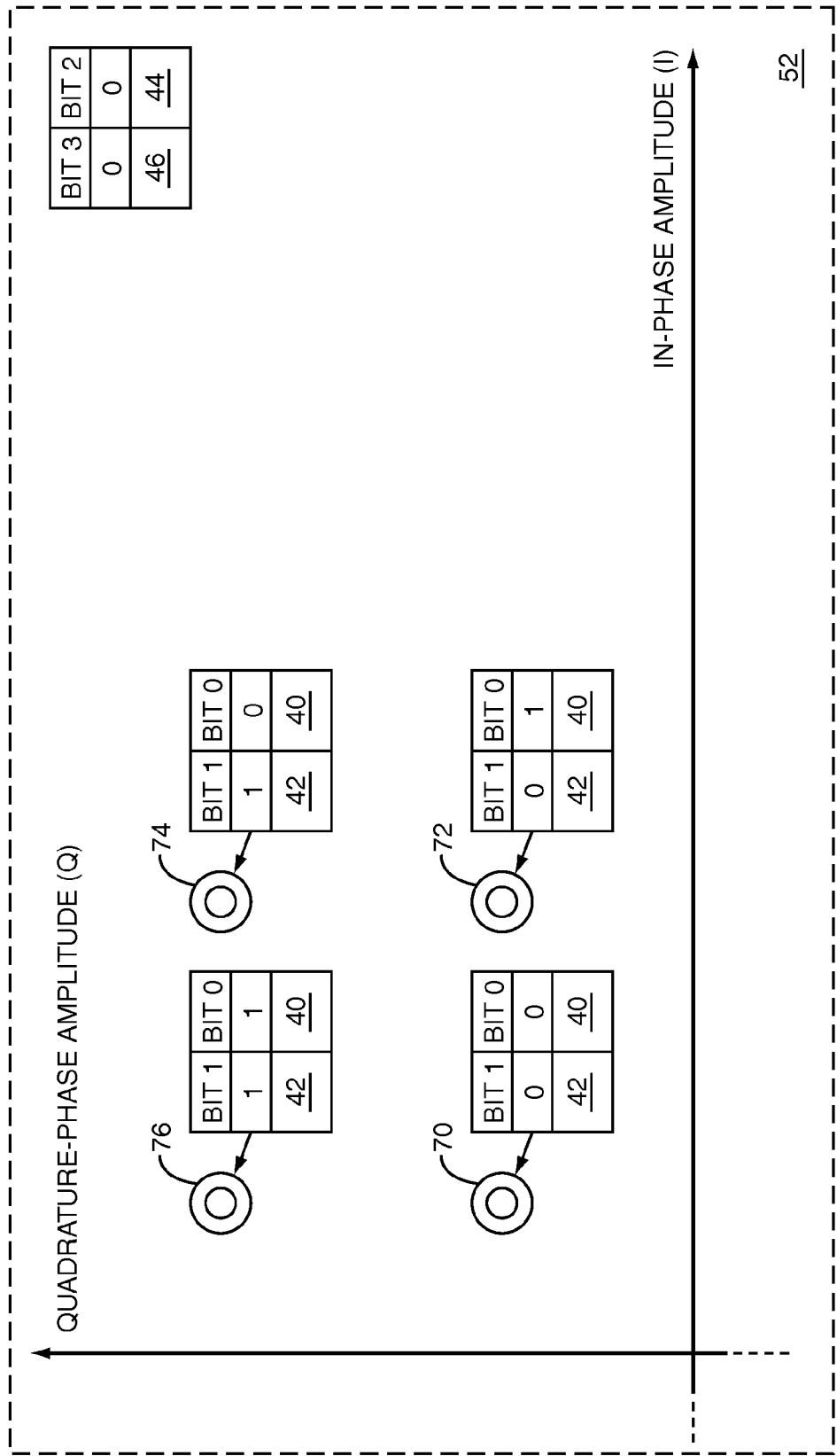
FIG. 6 shows the four constellation points used in the first quadrant of 16-QAM.

FIG. 6 shows the four constellation points used in the first quadrant 54 of 16-QAM, which includes the first quadrant points 70, 72, 74, 76. If the four first quadrant points 70, 72, 74, 76 are used to represent four different possible modulation points, then two bits of information can be encoded, which could correspond with bits zero and one 40, 42 of the higher modulation symbol 50. The first quadrant first higher point 70 may be represented with bit zero 40 equal to a zero and bit one 42 equal to a zero. The first quadrant second higher point 72 may be represented with bit zero 40 equal to a one and bit one 42 equal to a zero. The first quadrant third higher point 74 may be represented with bit zero 40 equal to a zero and bit one 42 equal to a one. The first quadrant fourth higher point 76 may be represented with bit zero 40 equal to a one and bit one 42 equal to a one. In one embodiment of the present invention, the phases and amplitudes separating the first quadrant points 70, 72, 74, 76 from each other may be less than the phases and amplitudes separating the groups of first quadrant points 70, 72, 74, 76, second quadrant points 78, 80, 82, 84, third quadrant points 86, 88, 90, 92, and fourth quadrant points 94, 96, 98, 100 from each other. Therefore, the reliability of data provided with the lower modulation symbol 48, called lower modulation layer data, may be greater than that provided for the higher modulation symbol 50, called higher modulation layer data, particularly with wireless communications links with low signal margins. In wireless communications links that operate with high signal margins most of the time, the difference in the reliabilities may be indetectable; however, the reliabilities over time, called average reliabilities, will show differences due to those situations that may occasionally produce low signal margins.

Broadcast data is data that is intended to be received by more than one end user. Another frequently encountered term in communications is multicast. One difference between broadcast data and multicast data is that broadcast data may be intended for more end users than multicast data. Additionally, multicast data may be transmitted with an expectation of an acknowledgement back from one or more end user. In this specification the term broadcast should be taken to mean broadcast, multicast, or both. Broadcast data may be audio, video, or both. Examples of broadcast data include video programs and audio programs. Broadcast data with national content may include network programs such as national newscasts or movies. Broadcast data with regional content may include regional newscasts or statewide information programs. Broadcast data with local content may include weather or traffic information. Broadcast data with basic content may include network channels or news channels. Broadcast data with supplemental content may include special interest channels, such as a sports channel or an educational channel. Unicast data is data that is intended to be received by one end user. Examples of unicast data include voice unicast data, such as cellular phone calls, specific unicast data, such as email messages, short message services, audio unicast data, such as an on-demand audio program, and video unicast data, such as an on-demand video program.

Broadcast data or unicast data may be transmitted using channels or sub-channels. A channel is a flow of information that contains all of the information associated with an information group, such as a video program together with its associated audio channels and sub-titles. Sub-channels are used to divide a channel into multiple flows of information for transmission over some medium, such as a cellular network. The information group is reconstructed by combining the sub-channels. Sub-channels are commonly used when communications channels in a communications system have inadequate bandwidth to handle the full bandwidth of the information being transmitted.

The present invention includes processing different information streams using different modulation layers. OFDM is a technique for distributing data over a number of OFDM sub-carriers, which can be created by a number of different methods, so long as each sub-carrier is orthogonal with respect to other sub-carriers. In this context, orthogonal means each sub-carrier does not interfere with the other sub-carriers. The orthogonality can be provided by using carriers at different frequencies, which is known as FDM and is associated with FDMA or OFDM, time multiplexing, which is known as TDM and is associated with TDMA, spatial multiplexing, which is associated with MIMO systems that have multiple antennas such that each antenna may have different information, or any combination thereof. The present invention includes dividing modulation symbols, called MDM associated with a new access technique called MDMA. Related to OFDM is SC-FDM. The present invention may be used to provide one or more sub-carriers in an OFDM or SC-FDM system. Additionally, the present invention may be used with numerous multiplexing techniques, including FDM, TDM, special multiplexing, MDM, OFDM, SC-FDM, or any combination thereof.

In one embodiment of the present invention, the modulation symbols 48, 50 may include different types of information selected from the following group, including video broadcast channels, video broadcast sub-channels, video unicast channels, video unicast sub-channels, audio broadcast channels, audio broadcast sub-channels, audio unicast channels, audio unicast sub-channels, voice unicast data, specific unicast data, OFDM data, OFDM sub-carriers, error correction bits, error checking bits, re-transmissions of information, received transmission acknowledgements, and other system control information. Other embodiments of the present invention may include more than two different modulation layers.

In one embodiment of the present invention, the lower modulation symbol 48 includes broadcast data having national content, and the higher modulation symbol 50 includes broadcast data having local content. In an alternate embodiment of the present invention, the lower modulation symbol 48 includes broadcast data having basic content, and the higher modulation symbol 50 includes broadcast data having supplemental content. In an additional embodiment of the present invention, the lower modulation symbol 48 includes information intended to be directly received by UE. The higher modulation symbol 50 includes information intended to be received by a relay station for forwarding to other relay stations, UE, or both. A base station may serve as a relay station. A synchronization signal may be included to synchronize transmissions to UE from multiple base stations or relay stations. The information included in the lower modulation symbol 48 may be repeated in the higher modulation symbol 50. The synchronization signal may include a preamble to facilitate synchronization.

The present invention includes processing different information streams using different modulation layers. Such processing may include providing an SFN. An SFN may be formed when multiple antennas in an RF communications system 10 transmit the same information on the same modulation layer at the same time, which provides robust data transmission since the multiple signals may fill in coverage holes caused by shadowing and multi-path effects; therefore, higher broadcast data rates may be feasible with SFN. SFN data may be included in the lower modulation symbol 48, the higher modulation symbol 50, or both. Some or all of the broadcast data that incorporates the present invention may include SFN data.

The present invention employs hierarchical modulation to simultaneously transmit information on different modulation layers using a carrier RF signal. In one embodiment of the present invention, first data to be transmitted is assigned to a first modulation layer and second data to be transmitted is assigned to a second modulation layer based on reliability criteria. The first and second modulation layers are hierarchical modulation layers of the carrier RF signal. Once assigned, the first data is transmitted using the first modulation layer of the carrier RF signal and the second data is transmitted using the second modulation layer of the carrier RF signal. One modulation layer is generally a higher order than the other modulation layer.

In one embodiment of the present invention, in many circumstances, the lower order modulation layer may be more reliable than the higher order modulation layer. In general, the reliability criteria takes the reliability characteristics of the different modulation layers into account when assigning the first and second data to the different modulation layers. For example, reliability information may be derived from signal strength measurements or channel conditions to determine an appropriate modulation to use for transmitting certain data. Alternatively, different data may be associated with different priorities in general, as well as different transmission priorities. In another example, entertainment channels may have a lower priority than emergency service channels. Although maintaining data integrity is important for file transfers, the relative transmission priority for a file transfer is generally lower than that for voice or other streaming media. In essence, the reliability criteria may relate to the communication channels, the data being transmitted, the transmission of the data, any combination thereof, or the like. For the various data, the reliability information is used to assign the various data to the different modulation layers for transmission.

In certain embodiments of the present invention, different data is broadcast to multiple users using different modulation layers. The different data is assigned to specific modulation layers based on reliability criteria. In one embodiment of the present invention, a single program is broken into two different data streams. One provides basic resolution content while the other provides optional higher resolution content. Upon receipt of the lower resolution content, only the lower resolution version of the program is available. If the higher resolution content is available, the lower and higher resolution versions of the program are combined to form a composite program of high resolution. With the present invention, the higher resolution content is transmitted using the higher order modulation layers and the lower resolution content is transmitted using the lower order modulation layers.

In voice applications, each modulation layer may support one or more voice calls. As such, the reliability criteria is used when assigning data for different voice calls to the different modulation layers. Some calls are supported on higher order modulation layers while others are supported on lower order modulation layers in light of the reliability criteria.

In one embodiment of the present invention, the base stations 12, 16 both transmit required broadcast data using the modulation layer with greater reliability, and transmit optional broadcast data using the modulation layer with lesser reliability. In an alternate embodiment of the present invention, the base stations 12, 16 both transmit either national or regional data using the modulation layer with greater reliability, wherein the first base station 12 transmits first local data and the second base station 16 transmits second local data using the modulation layer with lesser reliability. In an additional embodiment of the present invention, the base stations 12, 16 both transmit nominal resolution broadcast data using the modulation layer with greater reliability, and transmit enhanced resolution broadcast data using the modulation layer with lesser reliability. In an alternate embodiment of the present invention, the base stations 12, 16 both transmit basic programming data using the modulation layer with greater reliability, and transmit supplemental programming data using the modulation layer with lesser reliability. In yet another embodiment of the present invention, the base stations 12, 16 both may transmit broadcast video data. In an alternate embodiment of the present invention, the base stations 12, 16 may both transmit broadcast audio data.

In one embodiment of the present invention, the higher modulation layer data may include RF communications system control channel data. The base stations 12, 16 may both transmit broadcast data using lower modulation symbols 48, and the first base station 12 may transmit unicast data directed to the first mobile terminal 20 using higher modulation symbols 50. In an alternate embodiment of the present invention, the second base station 16 may transmit unicast data directed to the second mobile terminal 28 using one of the modulation symbols 48, 50, and transmit unicast data directed to the third mobile terminal 32 using the other of the modulation symbols 48, 50. The modulation layer with greater reliability is used with the data link with the lower signal margin, and the modulation layer with lower reliability is used with the data link with the greater signal margin. For example, a user close to a base station may have high reliability for both modulation layers; however, a more distant user may only have sufficient reliability for the lower order modulation layer; therefore, be assigning a voice call to the higher order modulation layer for the close user and a voice call to the lower order modulation layer for the distant user, both users can be accommodated.

The present invention includes transmitting different information using different modulation layers. Different embodiments will allocate the different information to the different modulation layers in different ways. Those skilled in the art will understand the concepts of the invention and will recognize applications of these concepts beyond the specific examples given. It should be understood that these concepts and applications fall within the scope of the disclosure and the accompanying claims. Specifically, the different information may be associated with any of the different modulation layers in any order.

FIG. 7A shows the alignment of lower modulation layer data 102 with higher modulation layer data 104 in one embodiment of the present invention. The lower modulation layer data 102 includes a first lower layer sample 106, a second lower layer sample 108, a third lower layer sample 110, and a fourth lower layer sample 112. The higher modulation layer data 104 includes a first higher layer sample 114, a second higher layer sample 116, a third higher layer sample 118, and a fourth higher layer sample 120. The lower layer samples 106, 108, 110, 112 are time aligned with the higher layer samples 114, 116, 118, 120. In mixing a system with phase and amplitude modulation, such as QAM, with a system having only phase modulation, such as QPSK, the constellation points of the QAM system may not directly align with the constellation points of the QPSK system; therefore, time-shifting the lower modulation layer data 102 from the higher modulation layer data 104 may improve signal margins. In an alternate embodiment of the present invention, the lower modulation layer data 102 is time-shifted from the higher modulation layer data 104 as illustrated in FIG. 7B. The higher layer samples 114, 116, 118 are time-shifted from the lower layer samples 106, 108, 110, 112, which may help average the higher layer samples 114, 116, 118 to make the lower layer samples 106, 108, 110, 112 line up closer to nominal constellation points of the QPSK system. A lower modulation rate for the lower modulation layer data 102 may further improve the impact of averaging. Even though the lower modulation layer data 102 is time-shifted from the higher modulation layer data 104, which means the lower modulation symbol 48 is time-shifted from the higher modulation symbol 50, both modulation symbols 48, 50 fall within one modulation symbol period and are effectively transmitted simultaneously.

Figure 8A:
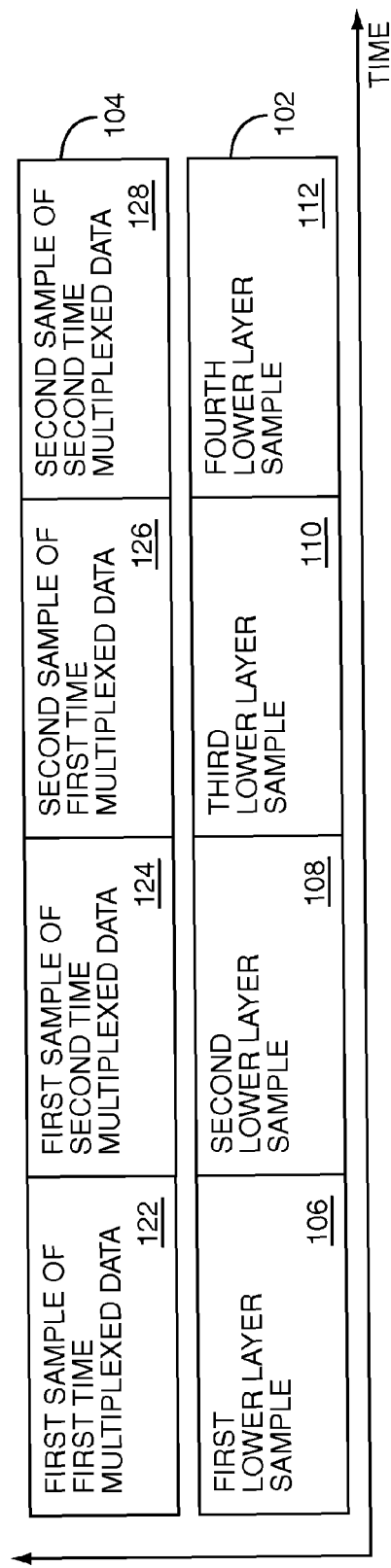
FIG. 8A shows time multiplexed data included in the higher modulation layer data.

FIG. 8A shows time multiplexed or TDM data included in the higher modulation layer data 104. The higher modulation layer data 104 includes a first sample of first time multiplexed data 122, a first sample of second time multiplexed data 124, a second sample of first time multiplexed data 126, and a second sample of second time multiplexed data 128. The samples 122, 126 of the first time multiplexed data are interspersed with the samples 124, 128 of the second time multiplexed data. Different channels, sub-channels, or unrelated data streams may be included in the higher modulation layer data 104. Other embodiments of the present invention may include TDM data in the higher modulation layer data 104, the lower modulation layer data 102, or both.

Figure 8B:
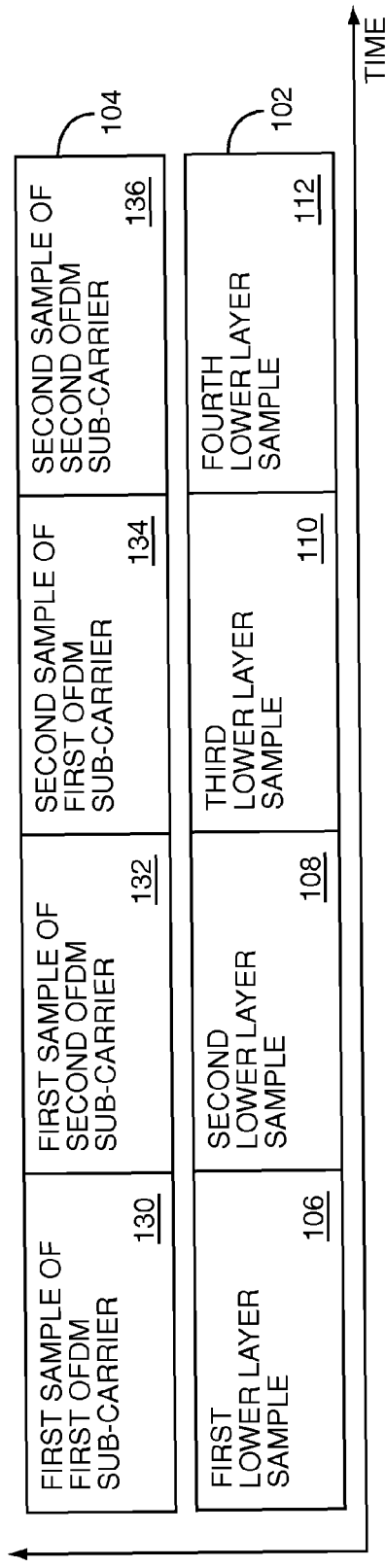
FIG. 8B shows two single-frequency OFDM sub-carriers included in the higher modulation layer data.

FIG. 8B shows two OFDM sub-carriers included in the higher modulation layer data 104. The higher modulation layer data 104 includes a first sample of a first OFDM sub-carrier 130, a first sample of a second OFDM sub-carrier 132, a second sample of the first OFDM sub-carrier 134, and a second sample of the second OFDM sub-carrier 136. The samples 130, 134 of the first OFDM sub-carrier are interspersed with the samples 132, 136 of the second OFDM sub-carrier. Other embodiments of the present invention may include OFDM data in the higher modulation layer data 104, the lower modulation layer data 102, or both.

FIG. 9 adds MIMO antennas to the base stations and some of the terminals illustrated in FIG. 1. The first base station 12 includes a second antenna port ANT2 coupled to a first MIMO base station antenna 138. The second base station 16 includes a second antenna port ANT2 coupled to a second MIMO base station antenna 140. The first mobile terminal 20 includes a second antenna port ANT2 coupled to a first MIMO mobile terminal antenna 142. The fixed terminal 24 includes a second antenna port ANT2 coupled to a fixed MIMO antenna 144. The third mobile terminal 32 includes a second antenna port ANT2 coupled to a second MIMO mobile terminal antenna 146. The second mobile terminal 28 does not have a MIMO antenna. The RF communications system 10 illustrated in FIG. 9 may represent a communications system that has been upgraded to include MIMO capability. The second mobile terminal 28 does not have MIMO capability and may represent a previous generation UE, or may be a low cost, reduced functionality UE sold for use in the MIMO RF communications system 10. By using the present invention, the second mobile terminal 28 may be able to transmit and receive lower modulation layer data 102 to and from the base stations 12, 16, and the other terminals 20,

24, 32 may be able to transmit and receive both modulation layer data 102, 104 to and from the base stations 12, 16.

The present invention includes processing different information streams using different modulation layers, such as MIMO. MIMO systems use multiple antennas for each base station or terminal. The multiple antennas may provide spatial diversity, which allows spatial multiplexing. Spatial multiplexing may allow different information to be transmitted and received from each of the multiple antennas. Other systems may use multiple antennas for diversity. Data from single antenna systems, such as the RF communications system 10 illustrated in FIG. 1, is known as SISO data. Data from multiple antenna systems that has different information associated with each antenna, such as the RF communications system 10 illustrated in FIG. 9, is known as MIMO data. By using SISO data with the lower modulation layer data 102 and MIMO data with the higher modulation layer data 104, the RF communications system 10 may be backward compatible by supporting previous generation communications protocols and present communications protocols.

FIG. 10 shows SISO data included in the lower modulation layer data 102, and two MIMO sub-channels included in the higher modulation layer data 104. The lower modulation layer data 102 includes a first SISO data sample 148, a second SISO data sample 150, a third SISO data sample 152, and a fourth SISO data sample 154. The higher modulation layer data 104 includes a first sample of a first MIMO sub-channel 156, a first sample of a second MIMO sub-channel 158, a second sample of the first MIMO sub-channel 160, and a second sample of the second MIMO sub-channel 162. The samples 156, 160 of the first MIMO sub-channel are interspersed with the samples 158, 162 of the second MIMO sub-channel. Other embodiments of the present invention may include MIMO data in the higher modulation layer data 104, the lower modulation layer data 102, or both.

FIG. 11 shows one embodiment of the present invention used with MIMO transmitter circuitry 164. First transmit circuitry 166 receives both lower modulation layer data LML and first higher modulation layer data $HML_1$. The first transmit circuitry 166 provides a first modulated RF signal to a first power amplifier 168, which provides an amplified first modulated RF signal to the first antenna port ANT1. The first modulated RF signal is based on both the lower modulation layer data LML and the first higher modulation layer data $HML_1$. Second transmit circuitry 170 receives both the lower modulation layer data LML and second higher modulation layer data $HML_2$. The second transmit circuitry 170 provides a second modulated RF signal to a second power amplifier 172, which provides an amplified second modulated RF signal to the second antenna port ANT2. The second modulated RF signal is based on both the lower modulation layer data LML and the second higher modulation layer data $HML_2$. The lower modulation layer data LML is sent to both antenna ports ANT1, ANT2. The first higher modulation layer data $HML_1$ is sent to only the first antenna port ANT1. The second higher modulation layer data $HML_2$ is sent to only the second antenna port ANT2. In one embodiment of the present invention, the lower modulation layer data LML includes basic broadcast data, the first higher modulation layer data $HML_1$ includes first supplemental data, and the second higher modulation layer data $HML_2$ includes second supplemental data. The second mobile terminal 28 may receive the basic broadcast data, and the other terminals 20, 24, 32 may receive the basic broadcast data, the first supplemental data, and the second supplemental data. All of the modulation layer data LML, $HML_1$, $HML_2$ is transmitted simultaneously. Each of the first and second higher modulation layer data $HML_1$, $HML_2$ is a MIMO sub-channel. The RF communications system 10 may have multiple base stations such that each base station has multiple antennas providing MIMO capability. All of the base stations and antennas may be used to form an SFN using the same lower modulation layer data LML. The first and second higher modulation layer data $HML_1$, $HML_2$ may be transmitted from different base stations, or an antenna on one base station may transmit the first higher modulation layer data $HML_1$ and an antenna on a different base station may transmit the second higher modulation layer data $HML_2$.

FIG. 12 shows details of the first base station 12 illustrated in FIG. 1. The basic architecture of the first base station 12 may include a receiver front end 174, a radio frequency transmitter section 176, an antenna 178, a duplexer or switch 180, a baseband processor 182, a control system 184, and a frequency synthesizer 186. The receiver front end 174 receives information bearing radio frequency signals from one or more remote transmitters provided by other base stations, terminals, or other user equipment. A low noise amplifier (LNA) 188 amplifies the signal. A filter circuit 190 minimizes broadband interference in the received signal, while down conversion and digitization circuitry 192 down converts the filtered, received signal to an intermediate or baseband frequency signal, which is then digitized into one or more digital streams. The receiver front end 174 typically uses one or more mixing frequencies generated by the frequency synthesizer 186. The baseband processor 182 processes the digitized received signal to extract the information or data bits conveyed in the received signal. This processing typically comprises demodulation, decoding, and error correction operations. As such, the baseband processor 182 is generally implemented in one or more digital signal processors (DSPs).

On the transmit side, the baseband processor 182 receives digitized data, which may represent voice, data, or control information, from the control system 184, which it encodes for transmission. The encoded data is output to the transmitter 176, where it is used by a modulator 194 to modulate a carrier signal that is at a desired transmit frequency. Power amplifier circuitry 196 amplifies the modulated carrier signal to a level appropriate for transmission, and delivers the amplified and modulated carrier signal to the antenna 178 through the duplexer or switch 180.

The following description provides an overview of a wireless communication environment and the architecture of a base station, or like access point, and a mobile terminal, which may be used in an OFDM and MIMO environment.

With reference to FIG. 13, a base station controller (BSC) 198 controls wireless communications within multiple cells 200, which are served by corresponding base stations (BS) 202. In general, each base station 202 facilitates communications using OFDM with mobile terminals 204, which are within the cell 200 associated with the corresponding base station 202. The movement of the mobile terminals 204 in relation to the base stations 202 results in significant fluctuation in channel conditions. As illustrated, the base stations 202 and mobile terminals 204 may include multiple antennas to provide spatial diversity for communications.

A high level overview of the mobile terminals 204 and base stations 202 of the present invention is provided prior to delving into structural and functional details. With reference to FIG. 14, a base station 202 configured according to one embodiment of the present invention is illustrated. The base station 202 generally includes a control system 206, a baseband processor 208, transmit circuitry 210, receive circuitry 212, multiple antennas 214, and a network interface 216. The receive circuitry 212 receives radio frequency signals bearing information from one or more remote transmitters provided by mobile terminals 204. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 208 processes the digitized received signal to extract the information or data bits conveyed in the received signal. This processing typically comprises demodulation, decoding, and error correction operations. As such, the baseband processor 208 is generally implemented in one or more DSPs or application-specific integrated circuits (ASICs). The received information is then sent to an associated network via the network interface 216 or transmitted to another mobile terminal 204 serviced by the base station 202.

On the transmit side, the baseband processor 208 receives digitized data, which may represent voice, data, or control information, from the network interface 216 under the control of the control system 206, and encodes the data for transmission. The encoded data is output to the transmit circuitry 210, where it is modulated by a carrier signal having a desired transmit frequency or frequencies. A power amplifier (not shown) will amplify the modulated carrier signal to a level appropriate for transmission, and deliver the modulated carrier signal to the antennas 214 through a matching network (not shown). Modulation and processing details are described in greater detail below. In one embodiment of the present invention, the base station 202 transmits signals using both antennas 214, but receives signals using a single antenna 214.

With reference to FIG. 15, a mobile terminal 204 configured according to one embodiment of the present invention is illustrated. Similarly to the base station 202, the mobile terminal 204 will include a control system 218, a baseband processor 220, transmit circuitry 222, receive circuitry 224, multiple antennas 226, and user interface circuitry 228. The receive circuitry 224 receives radio frequency signals bearing information from one or more base stations 202. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 220 processes the digitized received signal to extract the information or data bits conveyed in the received signal. This processing typically comprises demodulation, decoding, and error correction operations, as will be discussed in greater detail below. The baseband processor 220 is generally implemented in one or more DSP, ASIC, or both.

For transmission, the baseband processor 220 receives digitized data, which may represent voice, data, or control information, from the control system 218 or the interface circuitry 228, which it encodes for transmission. The encoded data is output to the transmit circuitry 222, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 226 through a matching network (not shown). In one embodiment of the present invention, the mobile terminal 204 receives signals using both antennas 226, but transmits signals using a single antenna 226. Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation may require the performance of an Inverse Discrete Fourier Transform (IDFT) on the information to be transmitted. For demodulation, the performance of a Discrete Fourier Transform (DFT) on the received signal is required to recover the transmitted information. In practice, the IDFT and DFT may be provided by digital signal processing carrying out an Inverse Fast Fourier Transform (IFFT) and Fast Fourier Transform (FFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is used for at least the downlink transmission from the base stations 202 to the mobile terminals 204. Each base station 202 is equipped with n transmit antennas 214, and each mobile terminal 204 is equipped with m receive antennas 226. Notably, the respective antennas can be used for reception and transmission using appropriate duplexers or switches and are so labeled only for clarity.

With reference to FIG. 16, a logical OFDM transmission architecture is provided according to one embodiment. Initially, the base station controller 198 may send channel quality indicator (CQI) information based on carrier-to-interference ratios (CIR) to the base station 202. Additionally, the base station controller 198 will send data to be transmitted to various mobile terminals 204 to the base station 202. The base station 202 may use the CQIs associated with the mobile terminals to schedule the data for transmission as well as select appropriate coding and modulation for transmitting the scheduled data. The CQIs may be provided by the mobile terminals 204 or determined at the base station 202 based on information provided by the mobile terminals 204. In either case, the CQI for each mobile terminal 204 is a function of the degree to which the channel amplitude (or response) varies across the OFDM frequency band.

Scheduled data 230, which is a stream of bits, is scrambled in a manner reducing the peak-to-average power ratio associated with the data using data scrambling logic 232. A cyclic redundancy check (CRC) for the scrambled data is determined and appended to the scrambled data using CRC adding logic 234. Next, channel coding is performed using channel encoder logic 236 to effectively add redundancy to the data to facilitate recovery and error correction at the mobile terminal 204. Again, the channel coding for a particular mobile terminal 204 is based on the CQI. The channel encoder logic 236 may use known Turbo encoding techniques in one embodiment. The encoded data is then processed by rate matching logic 238 to compensate for the data expansion associated with encoding.

Bit interleaver logic 240 systematically reorders the bits in the encoded data to minimize the loss of consecutive data bits. The resultant data bits are systematically mapped into corresponding symbols depending on the chosen baseband modulation by mapping logic 242. Preferably, QAM, QPSK, or higher modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 244.

At this point, groups of bits have been mapped into symbols representing locations in an amplitude and phase constellation. When spatial diversity is desired, blocks of symbols are then processed by space-time block code (STC) encoder logic 246, which modifies the symbols in a fashion making the transmitted signals more resistant to interference and more readily decoded at a mobile terminal 204. The STC encoder logic 246 will process the incoming symbols and provide n outputs corresponding to the number of transmit antennas 214 for the base station 202. The control system 206 and/or baseband processor 208 will provide a mapping control signal to control STC encoding. At this point, assume the symbols for the n outputs are representative of the data to be transmitted and capable of being recovered by the mobile terminal 204. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 202 has two antennas 214 (n=2) and the STC encoder logic 246 provides two output streams of symbols. Accordingly, each of the symbol streams output by the STC encoder logic 246 is sent to a corresponding IFFT processor 248, illustrated separately for ease of understanding. Those skilled in the art will recognize that one or more processors may be used to provide such digital signal processing, alone or in combination with other processing described herein. The IFFT processors 248 will preferably operate on the respective symbols to provide an inverse Fourier Transform. The output of the IFFT processors 248 provides symbols in the time domain. The time domain symbols are grouped into frames, which are associated with a prefix by like insertion logic 250. Each of the resultant signals is up-converted in the digital domain to an intermediate frequency and converted to an analog signal via the corresponding digital up-conversion (DUC) and digital-to-analog (D/A) conversion circuitry 252. The resultant (analog) signals are then simultaneously modulated at the desired RF frequency, amplified, and transmitted via the RF circuitry 254 and antennas 214. Notably, pilot signals known by the intended mobile terminal 204 are scattered among the sub-carriers. The mobile terminal 204, which is discussed in detail below, will use the pilot signals for channel estimation.

Reference is now made to FIG. 17 to illustrate reception of the transmitted signals by a mobile terminal 204. Upon arrival of the transmitted signals at each of the antennas 226 of the mobile terminal 204, the respective signals are demodulated and amplified by corresponding RF circuitry 256. For the sake of conciseness and clarity, only one of the two receive paths is described and illustrated in detail. Analog-to-digital (A/D) converter and down-conversion circuitry 258 digitizes and downconverts the analog signal for digital processing. The resultant digitized signal may be used by automatic gain control circuitry (AGC) 260 to control the gain of the amplifiers in the RF circuitry 256 based on the received signal level.

Initially, the digitized signal is provided to synchronization logic 262, which includes coarse synchronization logic 264, fine synchronization logic 266, and frequency offset and clock estimation logic 268. The coarse synchronization logic 264 buffers several OFDM symbols and calculates an autocorrelation between the two successive OFDM symbols. A resultant time index corresponding to the maximum of the correlation result determines a fine synchronization search window, which is used by fine synchronization logic 266 to determine a precise framing starting position based on the headers. The output of the fine synchronization logic 266 facilitates frame acquisition by frame alignment logic 270. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 272 and resultant samples are sent to frequency offset correction logic 274, which compensates for the system frequency offset caused by the unmatched local oscillators in the transmitter and the receiver. The synchronization logic 262 may include the frequency offset and clock estimation logic 268, which is based on the headers to help estimate such effects on the transmitted signal and provide those estimations to the correction logic 274 to properly process OFDM symbols.

At this point, the OFDM symbols in the time domain are ready for conversion to the frequency domain using FFT processing logic 276. The results are frequency domain symbols, which are sent to processing logic 278. The processing logic 278 extracts the scattered pilot signal using scattered pilot extraction logic 280, determines a channel estimate based on the extracted pilot signal using channel estimation logic 282, and provides channel responses for all sub-carriers using channel reconstruction logic 284. In order to determine a channel response for each of the sub-carriers, the pilot signal is essentially multiple pilot symbols that are scattered among the data symbols throughout the OFDM sub-carriers in a known pattern in both time and frequency. FIG. 18 illustrates an exemplary scattering of pilot symbols among available sub-carriers over a given time and frequency plot in an OFDM environment.

Continuing with FIG. 17, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel. The frequency domain symbols and channel reconstruction information, which are derived from the channel responses for each receive path, are provided to an STC decoder 286, which provides STC decoding on both receive paths to recover the transmitted symbols. For the sake of conciseness and clarity, only one of the two receive paths is described and illustrated in detail. The channel reconstruction information provides equalization information to the STC decoder 286 sufficient to remove the effects of the transmission channel when processing the respective frequency domain symbols.

The recovered symbols are placed back in order using symbol de-interleaver logic 288, which corresponds to the symbol interleaver logic 244 of the transmitter. The de-interleaved symbols are then demodulated or de-mapped to a corresponding bitstream using de-mapping logic 290. The bits are then de-interleaved using bit de-interleaver logic 292, which corresponds to the bit interleaver logic 240 of the transmitter architecture. The de-interleaved bits are then processed by rate de-matching logic 294 and presented to channel decoder logic 296 to recover the initially scrambled data and the CRC checksum. Accordingly, CRC logic 298 removes the CRC checksum, checks the scrambled data in traditional fashion, and provides it to the de-scrambling logic 300 for de-scrambling using the known base station de-scrambling code to recover the originally transmitted data 302.

In parallel to recovering the data 302, a CQI, or at least information sufficient to create a CQI at the base station 202, is determined and transmitted to the base station 14. As noted above, the CQI in a preferred embodiment is a function of the CIR, as well as the degree to which the channel response varies across the various sub-carriers in the OFDM frequency band. For this embodiment, the channel gains for each sub-carrier in the OFDM frequency band being used to transmit information are compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Continuing with FIG. 17, a relative variation measure may be determined by providing the channel response information from the channel estimation logic 282 to a channel variation analysis function 304, which will determine the variation and channel response for each of the sub-carriers in the OFDM frequency band, and if standard deviation is used, calculate the standard deviation associated with the frequency response. As noted, channel gain is a preferred measure of the channel response for calculating a CQI 306. The channel gain may be quantified based on a relative amplitude of the channel frequency response in decibels (dB), and as such, the amplitude of the channel frequency response may be represented by $H_{dB}(k)$, which is a function of a sub-carrier index k, where $k=1 \ldots k_{MIN}, \ldots k_{MAX}, \ldots k_{FFT}$. Notably, $k_{FFT}$ is the number of sub-carriers in the entire OFDM frequency band, and the sub-carriers $k_{MIN}$ through $k_{MAX}$ represent the sub-carriers within the OFDM frequency band that are actually used to transmit data. Typically, a range of sub-carriers at either end of the range of sub-carriers are not used, in order to minimize interference with other transmissions. As such, the degree of variation of the amplitude of the channel response may be determined only for the range of sub-carriers being used to transmit data ($k_{MIN}$ through $k_{MAX}$). The standard deviation of the channel response across the usable range of sub-carriers is calculated as follows:

$$std = \sqrt{\frac{1}{N_u - 1} \sum_{k_{MIN}}^{k_{MAX}} (H_{dB}(k) - \overline{H}_{dB})^2} ,$$ Eq. 1 where $N_u$ is the number of usable sub-carriers, $H_{dB}(k)$ is the log amplitude of the channel frequency response, and $\overline{H}_{db}$ is the mean of the log amplitude of the channel response across the usable range of sub-carriers or a subset thereof.

In a MIMO system where there are multiple transmit and multiple receive antennas 214, 226, each link corresponding to transmit/receive antenna pairs will have a unique CQI. An aggregate CQI, or set of aggregate CQIs, may be required for the overall MIMO set of links. To determine the aggregate CQIs, the channel frequency response and CIR for each transmit and receive antenna pair is determined.

For multiple receive antennas 226, the multiple channel frequency responses are combined to provide for the diversity achieved from the multiple receive antennas 226. This combining is an averaging of the power of the respective channel frequency responses across the OFDM frequency band. The channel variation measure is then determined across the combined channel frequency response. The CIR values for the respective multiple receive antennas 226 are combined by summing.

For multiple transmit antennas 214, the modification to the CQI will depend on the particular space time coding technique employed to reflect the method by which the transmit diversity is being achieved by the code and used by the system. Some schemes, such as transmit diversity, will require that the respective channel frequency responses from the multiple transmit antennas 214 be combined as described for the multiple receive antennas 226 by averaging the power of the channel frequency responses across the OFDM frequency band. The channel variation measure is made across the combined frequency response. Further, the CIR values for the multiple transmit antennas 214 are also combined. For other schemes, a separate CQI may be determined for each transmit antenna 214 and relayed back to the base station 202. The base station 202 may use the CQI per transmit antenna 214 to separately adapt the modulation and coding on the data transmitted on the respective transmit antennas 214.

Those skilled in the art will recognize improvements and modifications to the preferred embodiments of the present invention. All such improvements and modifications are considered within the scope of the concepts disclosed herein and the claims that follow.

What is claimed is:

1. A method for transmitting information from a first of at least one base station comprising:
   transmitting first data using a first modulation layer of a first carrier radio frequency (RF) signal during a first time period; and
   initiating transmission of second data using a second modulation layer of the first carrier RF signal during the first time period,
   wherein the first and second modulation layers are hierarchical modulation layers of the first carrier RF signal, and the first and second data are processed differently.

2. The method of claim 1 further comprising alternating between transmitting using a single modulation layer and transmitting using both the first and second modulation layers.

3. The method of claim 1 wherein the at least one base station has a plurality of antennas forming a single frequency network (SFN).

4. The method of claim 1 wherein the first of the at least one base station has a first antenna and a second antenna, wherein the first data is transmitted using the first and second antennas, and the second data is transmitted using only the first antenna.

5. The method of claim 4 wherein the first data comprises at least one program channel for a basic program service and the second data comprises at least one program channel for a supplemental program service.

6. The method of claim 4 wherein the first data comprises single-input single-output (SISO) data and the second data comprises multiple-input multiple-output (MIMO) data.

7. The method of claim 4 wherein the first of the at least one base station further comprises transmitting third data using only the second antenna.

8. The method of claim 4 further comprising a method for transmitting information from a second of at the least one base station comprising:
- transmitting third data using a third modulation layer of a second carrier radio frequency (RF) signal during a second time period; and
- initiating transmission of fourth data using a fourth modulation layer of the second carrier RF signal during the second time period, wherein the third and fourth modulation layers are hierarchical modulation layers of the second carrier RF signal, and the third and fourth data are processed differently.

9. The method of claim 1 wherein at least one of the first data and the second data comprises time multiplexed data.

10. The method of claim 1 wherein at least one of the first data and the second data is modulated onto a plurality of sub-carriers using orthogonal frequency division multiplexing (OFDM).

11. The method of claim 1 wherein at least one of the first data and the second data is modulated onto a plurality of sub-carriers using single-carrier frequency division multiplexing (SC-FDM).

12. The method of claim 1 wherein the first of the at least one base station has a first antenna and a second antenna, wherein the first data is transmitted using the first and second antennas, and the second data comprises third data and fourth data such that the third data is transmitted using only the first antenna and the fourth data is transmitted using only the second antenna.

13. The method of claim 1 wherein at least one of the first data and the second data is transmitted to user equipment (UE).

14. The method of claim 1 wherein the second data is transmitted to at least one relay station.

15. The method of claim 14 wherein the second data comprises synchronization information.

16. The method of claim 14 wherein a first of the at least one relay station is adapted to receive the second data at the second modulation layer and transmit the second data to at least one of a group consisting of at least one other of the at least one relay station, user equipment, and the at least one base station.

17. The method of claim 1 further comprising a method for transmitting information from a second of at the least one base station comprising:
- transmitting the first data using a third modulation layer of a second carrier radio frequency (RF) signal during a second time period; and
- initiating transmission of third data using a fourth modulation layer of the second carrier RF signal during the second time period, wherein the third and fourth modulation layers are hierarchical modulation layers of the second carrier RF signal.

18. The method of claim 1 wherein the first data comprises data unrelated to the second data.

19. The method of claim 1 wherein the first data comprises a different type of media content than the second data.

20. The method of claim 1 wherein the first carrier RF signal comprises a plurality of modulation symbols, such that each of certain of the plurality of modulation symbols comprises first order bits that provide the first data and second order bits that provide the second data.

21. The method of claim 1 wherein the second modulation layer is time-shifted from the first modulation layer.

22. The method of claim 21 wherein a modulation rate of the first modulation layer is less than a modulation rate of the second modulation layer.

23. A radio frequency (RF) communications system comprising:
- at least one communication interface; and
- a control system associated with the at least one communication interface and adapted to:
  - transmit first data using a first modulation layer of a first carrier RF signal during a first time period; and
  - initiate transmission of second data using a second modulation layer of the first carrier RF signal during the first time period, wherein the first and second modulation layers are hierarchical modulation layers of the first carrier RF signal, and the first and second data are processed differently.

24. The RF communications system of claim 23 further comprising user equipment (UE) adapted to receive the first carrier RF signal.

25. The RF communications system of claim 23 further comprising at least one relay station adapted to receive the first carrier RF signal.

* * * * *